US012388358B2

(12) United States Patent
Suzuki

(10) Patent No.: US 12,388,358 B2
(45) Date of Patent: Aug. 12, 2025

(54) POWER CONVERSION DEVICE

(71) Applicant: KABUSHIKI KAISHA TOYOTA JIDOSHOKKI, Aichi-ken (JP)

(72) Inventor: Sadanori Suzuki, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 189 days.

(21) Appl. No.: 18/282,916

(22) PCT Filed: Mar. 3, 2022

(86) PCT No.: PCT/JP2022/009252
§ 371 (c)(1),
(2) Date: Sep. 19, 2023

(87) PCT Pub. No.: WO2022/202206
PCT Pub. Date: Sep. 29, 2022

(65) Prior Publication Data
US 2024/0162810 A1     May 16, 2024

(30) Foreign Application Priority Data
Mar. 25, 2021  (JP) ................................ 2021-051727

(51) Int. Cl.
*H02M 1/42* (2007.01)
*H02M 1/15* (2006.01)
(Continued)

(52) U.S. Cl.
CPC ........... *H02M 1/4283* (2021.05); *H02M 1/15* (2013.01); *H02M 1/4233* (2013.01);
(Continued)

(58) Field of Classification Search
CPC ............. H02M 1/4233; H02M 1/4241; H02M 1/4258; H02M 1/4283; H02M 1/15
See application file for complete search history.

(56) References Cited

U.S. PATENT DOCUMENTS 11,901,829 B2 * 2/2024 Suzuki .................. H02M 7/797
2003/0063480 A1 * 4/2003 Morita .............. H02M 3/33569
363/37
(Continued)

FOREIGN PATENT DOCUMENTS

JP          2019-041428 A       3/2019

OTHER PUBLICATIONS

Search Report issued in WIPO Patent Application No. PCT/JP2022/009252, dated May 17, 2022.
(Continued)

*Primary Examiner* — Jue Zhang
(74) *Attorney, Agent, or Firm* — Greenblum & Bernstein, P.L.C.

(57) ABSTRACT

A power conversion device converts AC voltage into DC voltage. The power conversion device includes a transformer, a first capacitor, a primary circuit, a rectifying-smoothing circuit, and a controller. The primary circuit includes a bridge circuit having two arm switching elements, and is connected to a primary winding of the transformer via the first capacitor. The rectifying-smoothing circuit includes a secondary diode and an output capacitor. The primary circuit includes a buffer circuit having a buffer capacitor and a buffer switching element. The controller controls switching of switching elements.

8 Claims, 17 Drawing Sheets

(51) Int. Cl.
*H02M 1/44* (2007.01)
*H02M 7/217* (2006.01)
*H02M 7/25* (2006.01)

(52) U.S. Cl.
CPC ........... *H02M 1/4258* (2013.01); *H02M 1/44* (2013.01); *H02M 7/2176* (2013.01); *H02M 7/25* (2013.01)

(56) References Cited

U.S. PATENT DOCUMENTS

2015/0263605 A1    9/2015   Alam
2021/0184566 A1*   6/2021   Usami ............... H02M 3/33592

OTHER PUBLICATIONS

Zhang Zhi et al.: "Analysis and Design of a Single Stage Bridgeless Isolated AC-DC Resonant Converter for Programmable AC Power Source Ap plications" IEEE Access, IEEE, USA, vol. 8, Dec. 4, 2020 (Dec. 4, 2020), pp. 219071-219082, XP011825600, DOI: 10.1109/ACCESS.2020.3042541 [retrieved on Dec. 11, 2020].

* cited by examiner

POWER CONVERSION DEVICE

TECHNICAL FIELD

The present disclosure relates to a power conversion device, and more particularly, to a circuit that converts AC voltage to DC voltage and insulates input from output.

BACKGROUND ART

A known power conversion device includes a transformer, a rectifier circuit and an inverter circuit provided on the primary side of the transformer, and a rectifier circuit provided on the secondary side of the transformer (for example, Patent Literature 1) as a circuit that insulates input from output and converts AC voltage to DC voltage. In the power conversion device disclosed in Patent Literature 1, the two rectifier circuits and the inverter circuit are full-bridge circuits. In this circuit, an input AC voltage is converted into DC voltage by the rectifier circuit on the primary side, then converted into a high-frequency AC voltage by the inverter circuit, and applied to the transformer. The AC voltage is transmitted to the secondary side of the transformer in a state of being insulated by the transformer, and is converted into DC voltage again by the rectifier circuit on the secondary side.

Since the power conversion device disclosed in Patent Literature 1 uses a total of three full-bridge circuits including two rectifier circuits and one inverter circuit, the number of active elements is twelve. The active element is a generic term for a switching element (e.g., a MOSFET) and a rectifier element (e.g., a diode).

For example, a switching power supply device shown in FIG. 23 of Patent Literature 2 is known as a circuit that isolates input from output and converts AC voltage to DC voltage with fewer active elements. In the switching power supply device shown in FIG. 23 of Patent Literature 2, AC voltage is applied to a bridge circuit including two switching elements and two rectifier elements via an inductor, power factor control is performed in the bridge circuit, and then power is transmitted to the secondary side of a transformer via a capacitor and a transformer. In a secondary circuit of the transformer, the power transmitted via the capacitor is converted into DC voltage by the rectifier circuit and the converted power is output. The switching power supply device shown in FIG. 23 of Patent Literature 2 includes seven active elements.

CITATION LIST

Patent Literature

Patent Literature 1: Japanese Laid-Open Patent Publication No. 2019-41428
Patent Literature 2: U.S. Patent Application Publication No. 2015/0263605

SUMMARY OF INVENTION

Problems that the Invention is to Solve

In the switching power supply device shown in FIG. 23 of Patent Literature 2, two switching elements S1, S2 included in the bridge circuit simultaneously enter a conductive state or a non-conductive state. As shown in FIG. 10A of Patent Literature 2, a switching element Sa is controlled to the non-conductive state when the switching elements S1, S2 are in the conductive state and to the conductive state when the switching elements S1, S2 are in the non-conductive state. Thus, in the switching power supply device shown in FIG. 23 of Patent Literature 2, the control parameter is only one of the duties of the switching elements S1, S2.

Solution to Problem

A power conversion device designed to address the above problem converts AC voltage input from an AC power supply into DC voltage. The power conversion device includes a transformer including a primary winding and a secondary winding, a first capacitor, a primary circuit including two input terminals to which the AC power supply is connected, a first inductor, an upper arm switching element, a lower arm switching element, an upper arm rectifier element, and a lower arm rectifier element, and a rectifying-smoothing circuit including a second inductor, a secondary rectifier element, an output capacitor, a first output terminal, and a second output terminal. A series connection of the upper arm switching element and the lower arm switching element and a series connection of the upper arm rectifier element and the lower arm rectifier element form a bridge circuit, and a connection point between the upper arm switching element and the lower arm switching element and a connection point between the upper arm rectifier element and the lower arm rectifier element are connected to each other via the two input terminals and the first inductor. The primary circuit includes a buffer circuit having a buffer switching element and a buffer capacitor. The primary circuit is connected to the primary winding of the transformer via the first capacitor. The rectifying-smoothing circuit is connected to the secondary winding of the transformer. The power conversion device comprises a controller configured to control switching of the upper arm switching element, the lower arm switching element, and the buffer switching element. The controller controls switching to sequentially switch a switching pattern including a pattern in which one of the two arm switching elements enters a conductive state so that the AC power supply is short-circuited by the first inductor, the other one of the two arm switching elements enters a non-conductive state, and the buffer switching element enters the conductive state.

In this configuration, the switching of each switching element is controlled to insulate input from output using a transformer convert AC voltage into DC voltage. This reduces the number of active elements as compared to a conventional circuit. Further, the use of the buffer circuit limits surge voltage that results from, for example, leakage inductance of the transformer.

Additionally, a specific pattern is included as the switching pattern. Thus, the control parameter is set to two values; namely, the duty of the upper arm switching element or the lower arm switching element and the duty of the buffer switching elements. The use of two control parameters, for example, reduces the ripple of an output voltage while maintaining the performance of controlling the power factor and the output voltage.

In the power conversion device, the buffer circuit may be connected in parallel to the bridge circuit.

This configuration allows the power conversion device to limit the occurrence of surge voltages.

In the power conversion device, the buffer circuit may be connected in parallel to the primary winding of the transformer.

This configuration allows the power conversion device to reduce surge voltages and lower the voltage applied to the buffer capacitor.

The power conversion device may further include a second capacitor. In the rectifying-smoothing circuit, the first output terminal and a first terminal of the output capacitor may be connected to each other, the second output terminal and a second terminal of the output capacitor may be connected to each other, a first terminal of the second inductor may be connected to the first terminal of the output capacitor via the secondary rectifier element, and a second terminal of the second inductor may be connected to the second terminal of the output capacitor. The rectifying-smoothing circuit may be connected to the secondary winding of the transformer via the second capacitor. The primary winding and the secondary winding may be magnetically coupled to each other to have a polarity such that the secondary rectifier element becomes conductive when at least one of the upper arm switching element and the lower arm switching element is in the non-conductive state.

The power conversion device may further include a second capacitor. In the rectifying-smoothing circuit, the first output terminal and a first terminal of the output capacitor may be connected to each other, the second output terminal and a second terminal of the output capacitor may be connected to each other, a first terminal of the secondary rectifier element may be connected to the first terminal of the output capacitor via the second inductor, and a second terminal of the secondary rectifier element may be connected to the second terminal of the output capacitor. The rectifying-smoothing circuit may be connected to the secondary winding of the transformer via the second capacitor. The primary winding and the secondary winding may be magnetically coupled to each other to have a polarity such that the secondary rectifier element becomes conductive when at least one of the upper arm switching element and the lower arm switching element is in the non-conductive state.

In the power conversion device, the rectifying-smoothing circuit may include a first secondary rectifier element and a second secondary rectifier element as the secondary rectifier element. The first output terminal and a first terminal of the output capacitor may be connected to each other. The second output terminal and a second terminal of the output capacitor may be connected to each other. A first terminal of the first secondary rectifier element may be connected to the first terminal of the output capacitor via the second inductor. A second terminal of the first secondary rectifier element may be connected to a first terminal of the secondary winding. A first terminal of the second secondary rectifier element may be connected to a connection point between the second inductor and the first secondary rectifier element. A second terminal of the second secondary rectifier element may be connected to a second terminal of the secondary winding. The second terminal of the output capacitor may be connected to a midpoint of the secondary winding. The primary winding and the secondary winding may be magnetically coupled to each other to have a polarity such that one of the first secondary rectifier element and the second secondary rectifier element becomes conductive when one of the upper arm switching element and the lower arm switching element is in the non-conductive state.

In the power conversion device, when one or all of the upper arm rectifier element, the lower arm rectifier element, and the secondary rectifier element include switching elements, the controller may control switching of the switching elements based on the AC voltage and current that flows through the first inductor such that a power factor of input power is corrected. This configuration allows for control of the power factor of power supplied from the AC power supply.

In the power conversion device, when one or all of the upper arm rectifier element, the lower arm rectifier element, and the secondary rectifier element include switching elements, the controller may control switching of the switching elements based on a voltage between the first output terminal and the second output terminal such that a predetermined DC voltage is output. Such a configuration allows the output voltage to be controlled to a desired value.

Advantageous Effects of Invention

The present disclosure provides a power conversion device that insulates input from output with fewer active elements than a conventional circuit and coverts AC voltage into DC voltage. Further, the power conversion device includes two control parameters.

DESCRIPTION OF EMBODIMENTS

Figure 1:
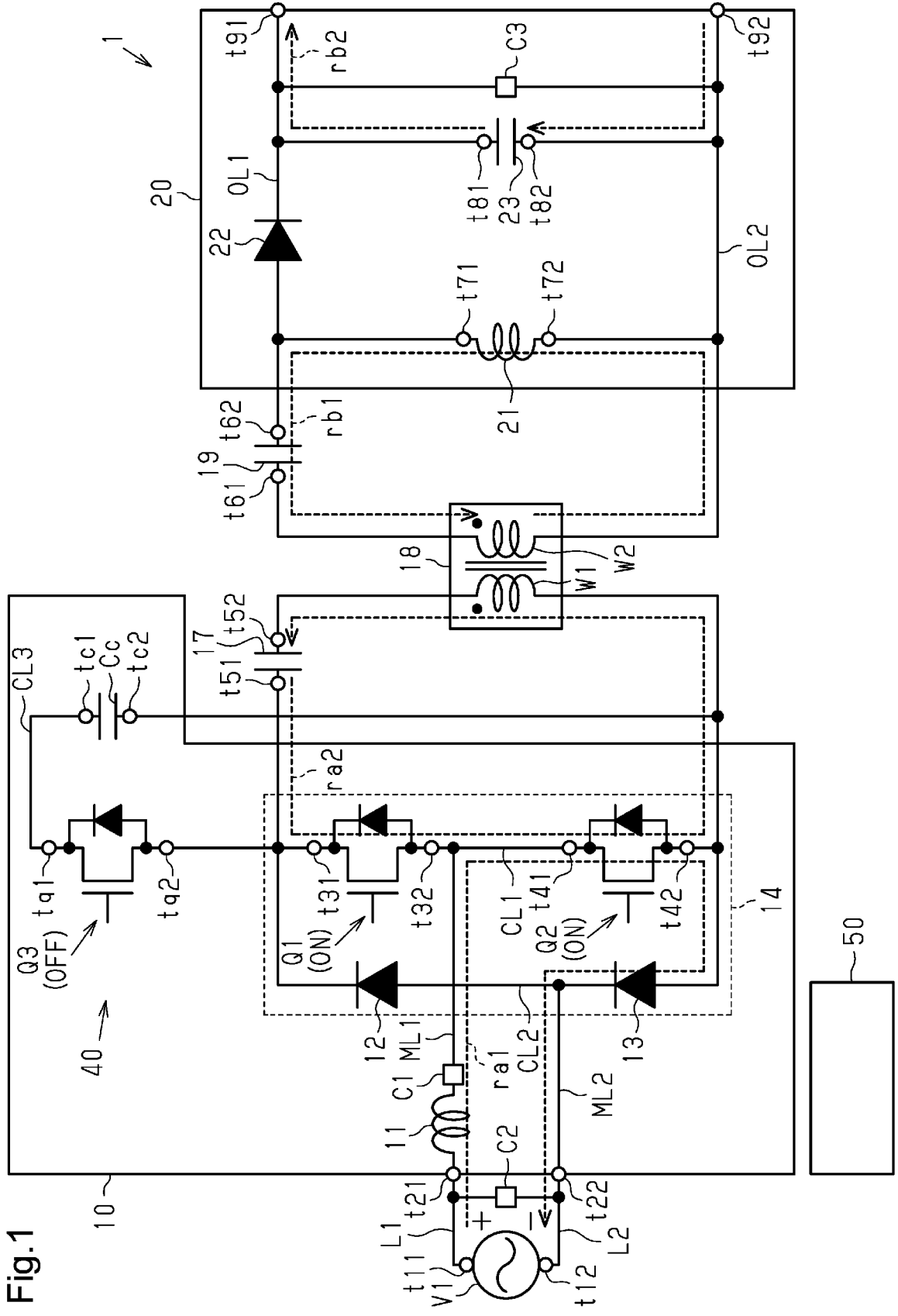
FIG. 1 is a circuit diagram showing a power conversion device 1 in a first state.

An embodiment of the present disclosure will now be described. A power conversion device 1 converts AC voltage supplied from an AC power supply V1 into DC voltage and supplies the DC voltage to a load connected to the power conversion device 1.

The power conversion device 1 includes, for example, a primary circuit 10, a first capacitor 17, a transformer 18, a second capacitor 19, a rectifying-smoothing circuit 20, and a controller 50.

Primary Circuit 10

The primary circuit 10 includes, for example, a first inductor 11, an upper arm diode 12, a lower arm diode 13, an upper arm switching element Q1, a lower arm switching element Q2, a first connection line CL1, a second connection line CL2, a first intermediate line ML1, a second intermediate line ML2, a first input terminal t21, a second input terminal t22, and a buffer circuit 40. The upper arm diode 12 is an example of an upper arm rectifier element, and the lower arm diode 13 is an example of a lower arm rectifier element.

The AC power supply V1 and the primary circuit 10 are electrically connected to each other. Specifically, a first terminal t11 of the AC power supply V1 and a first input terminal t21 of the primary circuit 10 are connected to each other by a first input line L1. A second terminal t12 of the AC power supply V1 and a second input terminal t22 of the primary circuit 10 are connected to each other by a second input line L2. As a result, AC voltage is input to the input terminals t21, t22.

The upper arm diode 12 and the lower arm diode 13 are connected in series to each other by the second connection line CL2. Specifically, the second connection line CL2 connects the anode of the upper arm diode 12 to the cathode of the lower arm diode 13.

The upper arm switching element Q1 includes a first terminal t31 and a second terminal t32, and the lower arm switching element Q2 includes a first terminal t41 and a second terminal t42. The first connection line CL1 connects the second terminal t32 of the upper arm switching element Q1 to the first terminal t41 of the lower arm switching element Q2. The upper arm switching element Q1 and the lower arm switching element Q2 are, for example, power switching elements, and are n-type power MOSFETs in the present embodiment. The two arm switching elements Q1, Q2 have body diodes. However, the upper arm switching elements Q1 and the lower arm switching elements Q2 are not limited to MOSFETs, and may be, for example, IGBTs having anti-parallel diodes.

The first intermediate line ML1 connects the first connection line CL1 to the first input terminal t21. The first inductor 11 is provided on the first intermediate line ML1. The second intermediate line ML2 connects the second connection line CL2 to the second input terminal t22. Thus, a connection point between the arm switching elements Q1, Q2 (i.e., a point on the first connection line CL1) and a connection point between the two arm diodes 12, 13 (i.e., a point on the second connection line CL2) are connected to each other via the two input terminals t21, t22 and the first inductor 11.

The cathode of the upper arm diode 12 and the first terminal t31 of the upper arm switching element Q1 are connected to each other, and the anode of the lower arm diode 13 and the second terminal t42 of the lower arm switching element Q2 are connected to each other. Thus, the series connection of the upper arm switching element Q1 and the lower arm switching element Q2 and the series connection of the upper arm diode 12 and the lower arm diode 13 form a bridge circuit 14.

The transformer 18 is an insulating transformer including a primary winding W1 and a secondary winding W2. A starting end of the primary winding W1 (a side indicated by a black circle in FIG. 1) is connected to the cathode of the upper arm diode 12 and the first terminal t31 of the upper arm switching element Q1 via the first capacitor 17. Specifically, the first capacitor 17 includes a first terminal t51 and a second terminal t52. The starting end of the primary winding W1 is connected to the second terminal t52 of the first capacitor 17, and the first terminal t51 of the first capacitor 17 is connected to the cathode of the upper arm diode 12 and the first terminal t31 of the upper arm switching element Q1. A finishing end of the primary winding W1 (a side to which a black circle is not attached in FIG. 1) is connected to the anode of the lower arm diode 13 and the second terminal t42 of the lower arm switching element Q2. Thus, the primary circuit 10 is connected to the primary winding W1 of the transformer 18 via the first capacitor 17.

Rectifying-Smoothing Circuit 20

The rectifying-smoothing circuit 20 includes a second inductor 21, a secondary diode 22, an output capacitor 23, a first output line OL1, a second output line OL2, a first output terminal t91, and a second output terminal t92. The second inductor 21 includes a first terminal t71 and a second terminal t72, and the output capacitor 23 includes a first terminal t81 and a second terminal t82. The secondary diode 22 is an example of a secondary rectifier element. In addition, the first terminal t81 is an example of one terminal (i.e., first terminal) of the output capacitor, and the second terminal t82 is an example of the other terminal (second terminal) of the output capacitor.

A starting end of the secondary winding W2 (a side indicated by a black circle in FIG. 1) is connected to the first terminal t71 of the second inductor 21 and the anode of the secondary diode 22 via the second capacitor 19. Specifically, the second capacitor 19 includes a first terminal t61 and a second terminal t62. The starting end of the secondary winding W2 is connected to the first terminal t61 of the second capacitor 19, and the second terminal t62 of the second capacitor 19 is connected to the first terminal t71 of the second inductor 21 and the anode of the secondary diode 22. A finishing end of the secondary winding W2 (a side to which a black circle is not attached in FIG. 1) is connected to the second terminal t72 of the second inductor 21. Thus, the rectifying-smoothing circuit 20 is connected to the secondary winding W2 of the transformer 18 via the second capacitor 19.

The output capacitor 23 is connected to the first output line OL1 and the second output line OL2. Specifically, the first terminal t81 of the output capacitor 23 is connected to the first output line OL1. The first output line OL1 is connected to the first output terminal t91. Thus, the first terminal t81 of the output capacitor 23 is connected to the first output terminal t91. Further, the second terminal t82 of the output capacitor 23 is connected to the second output line OL2. The second output line OL2 is connected to the second output terminal t92. Thus, the second terminal t82 of the output capacitor 23 is connected to the second output terminal t92.

The second inductor 21 is connected to the secondary diode 22 and the second output line OL2. Specifically, the first terminal t71 of the second inductor 21 is connected to the anode of the secondary diode 22, and the second terminal t72 of the second inductor 21 is connected to the second output line OL2. The first terminal t71 is an example of one terminal (i.e., first terminal) of the second inductor, and the second terminal t72 is an example of the other terminal (i.e., second terminal) of the second inductor.

The secondary diode 22 is located between the second inductor 21 and the output capacitor 23. As described above, the anode of the secondary diode 22 and the first terminal t71 of the second inductor 21 are connected to each other. The cathode of the secondary diode 22 is connected to the first terminal t81 of the output capacitor 23.

Buffer Circuit 40

The buffer circuit 40 includes a buffer switching element Q3, a buffer capacitor Cc, and a third connection line CL3. The buffer switching element Q3 and the buffer capacitor Cc are connected in series to each other by the third connection line CL3. The buffer switching element Q3 includes terminals tq1, tq2, and the buffer capacitor Cc includes terminals tc1, tc2. The terminal tq1 of the buffer switching element Q3 and the terminal tc1 of the buffer capacitor Cc are connected to each other by the third connection line CL3. The buffer switching element Q3 includes a body diode. The anode of the body diode of the buffer switching element Q3 is connected to the terminal tq2, and the cathode of the body diode of the buffer switching element Q3 is connected to the terminal tq1.

The buffer circuit 40 is connected in parallel to the bridge circuit 14. Specifically, the terminal tq2 of the buffer switching element Q3 is connected to a connection point between the cathode of the upper arm diode 12 and the first terminal t31 of the upper arm switching element Q1. The terminal tc2 of the buffer capacitor Cc is connected to a connection point between the anode of the lower arm diode 13 and the second terminal t42 of the lower arm switching element Q2.

Controller 50

As shown in FIG. 1, the power conversion device 1 includes a current sensor C1 that detects current flowing through the first inductor 11. The power conversion device 1 also includes a voltage sensor C2 that detects an input voltage and a voltage sensor C3 that detects an output voltage. The current sensor C1, the voltage sensor C2, and the voltage sensor C3 output their detection results to the controller 50.

The controller 50 turns on and off the two arm switching elements Q1, Q2 and the buffer switching elements Q3 based on signals from the current sensor C1, the voltage sensor C2 and the voltage sensor C3.

The power conversion device 1 converts the AC voltage supplied from the AC power supply V1 into DC voltage by switching between a conductive state and a non-conductive state of each of the switching elements Q1 to Q3, and outputs the DC voltage from the two output terminals t91, t92.

A combination of conductive states (ON states) or non-conductive states (OFF states) of the switching elements Q1 to Q3 is referred to as a switching pattern. In the present embodiment, the switching pattern is set to a first pattern P1, a second pattern P2, a third pattern P3, a fourth pattern P4, a fifth pattern P5, and a sixth pattern P6. The controller 50 sets an operation of switching the switching pattern in the order of P1, P2, P3, P4, P5, P6; P1 as one unit, and performs switching control of repeatedly executing the unit operation in a predetermined cycle.

The first pattern P1 is a switching pattern in which the buffer switching element Q3 is in the non-conductive state, and the upper arm switching element Q1 and the lower arm switching element Q2 are in the conductive state.

The second pattern P2 is a switching pattern in which the upper arm switching element Q1 and the buffer switching element Q3 are in the non-conductive state, and the lower arm switching element Q2 is in the conductive state.

The third pattern P3 is a switching pattern in which the upper arm switching element Q1 is in the non-conductive state, and the lower arm switching element Q2 and the buffer switching element Q3 are in the conductive state. In the present embodiment, the third pattern P3 corresponds to a specific pattern.

The fourth pattern P4 is a switching pattern in which the upper arm switching element Q1 and the lower arm switching element Q2 are in the non-conductive state, and the buffer switching element Q3 is in the conductive state. In the present embodiment, the fourth pattern P4 corresponds to a dead time pattern.

The fifth pattern P5 is a switching pattern in which the lower arm switching element Q2 is in the non-conductive state and the upper arm switching element Q1 and the buffer switching element Q3 are in the conductive state.

The sixth pattern P6 is a switching pattern in which the lower arm switching element Q2 and the buffer switching element Q3 are in the non-conductive state and the upper arm switching element Q1 is in the conductive state.

The operation of the power conversion device 1 will now be described in detail with reference to FIGS. 1 to 12. In the AC power supply V1, a state in which the potential at the first terminal t11 is higher than the potential at the second terminal t12 is referred to as a state in which the AC potential is positive. A state in which the potential at the first terminal t11 is lower than the potential at the second terminal t12 is referred to as a state in which the AC potential is negative. In the state in which the AC potential is positive, the AC voltage input from the AC power supply V1 has a positive polarity. In the state in which the AC potential is negative, the AC voltage input from the AC power supply V1 has a negative polarity.

The operation in the state in which the AC potential is negative is the same as that in the state in which the AC potential is positive, except that the operations of the two arm switching elements Q1, Q2 are reversed in response to polarity reversal so that the current flows not through the lower arm diode 13 but through the upper arm diode 12. Thus, the state in which the AC potential is positive will be hereinafter described, and the state in which the AC potential is negative will not be described.

To facilitate understanding, the power conversion device 1 is in a steady state at a time when the power conversion device 1 starts operating. That is, each of the capacitors 17, 19, 23 is charged with its respective voltage. Further, current flows through each of the first inductor 11, the primary winding W1 and the secondary winding W2 of the transformer 18, and the second inductor 21. The primary circuit 10, the first capacitor 17, and the primary winding W1 are also referred to as the primary side of the power conversion device 1, and the secondary winding W2, the second capacitor 19, and the rectifying-smoothing circuit 20 are also referred to as the secondary side of the power conversion device 1.

The controller 50 repeatedly executes switching control for switching the switching pattern from the first pattern P1 through the patterns P2 to P6 to the first pattern P1 in a situation in which the AC potential is positive. As a result, the state of the power conversion device 1 transitions from a first state φ1 to a ninth state φ9. Each state will now be described in detail.

First State φ1

In the first state φ1, which is illustrated in FIG. 1, the controller 50 controls the switching pattern to the first pattern P1. As shown in FIG. 1, in the first state φ1, on the primary side of the power conversion device 1, current flows through a current path ra1 resulting from the supply of power from the AC power supply V1 and a current path ra2 resulting from the discharge of the first capacitor 17.

The current path ra1 runs from the first terminal t11 of the AC power supply V1 through the first inductor 11, a drain-source section of the lower arm switching element Q2, and the lower arm diode 13 to the second terminal t12 of the AC power supply V1. In the first state φ1, the current flowing through the current path ra1 increases over time in a direction from the AC power supply V1 toward the first inductor 11.

The current path ra2 runs from the first terminal t51 of the first capacitor 17 through a drain-source section of the upper arm switching element Q1, the drain-source section of the lower arm switching element Q2, the finishing end of the primary winding W1, and the starting end of the primary winding W1 to the second terminal t52 of the first capacitor 17. The voltage across the first capacitor 17 is applied to the primary winding W1 of the transformer 18. Thus, the potential at the finishing end of the primary winding W1 becomes higher than the potential at the starting end. As a result, a voltage is generated across the secondary winding W2 of the transformer 18 such that the potential at the finishing end is higher than the potential at the starting end.

In the first state φ1, on the secondary side of the power conversion device 1, current flows through a current path rb1 and a current path rb2 resulting from the discharge of the output capacitor 23. The current path rb1 is produced by the voltage generated across the secondary winding W2 of the transformer 18. The current path rb1 runs from the finishing end of the secondary winding W2 through the second inductor 21 and the second capacitor 19 to the starting end of the secondary winding W2.

The current path rb2 runs from the first terminal t81 of the output capacitor 23 through the first output terminal t91, a load (not shown) connected to the power conversion device 1, and the second output terminal t92 to the second terminal t82 of the output capacitor 23. DC voltage, which is the voltage across the output capacitor 23, is generated between the first and second output terminals t91, t92. The discharge of the output capacitor 23 causes current to be supplied to the load. In the first state tp1, the secondary diode 22 does not enter the conductive state.

Second State φ2

Figure 2:
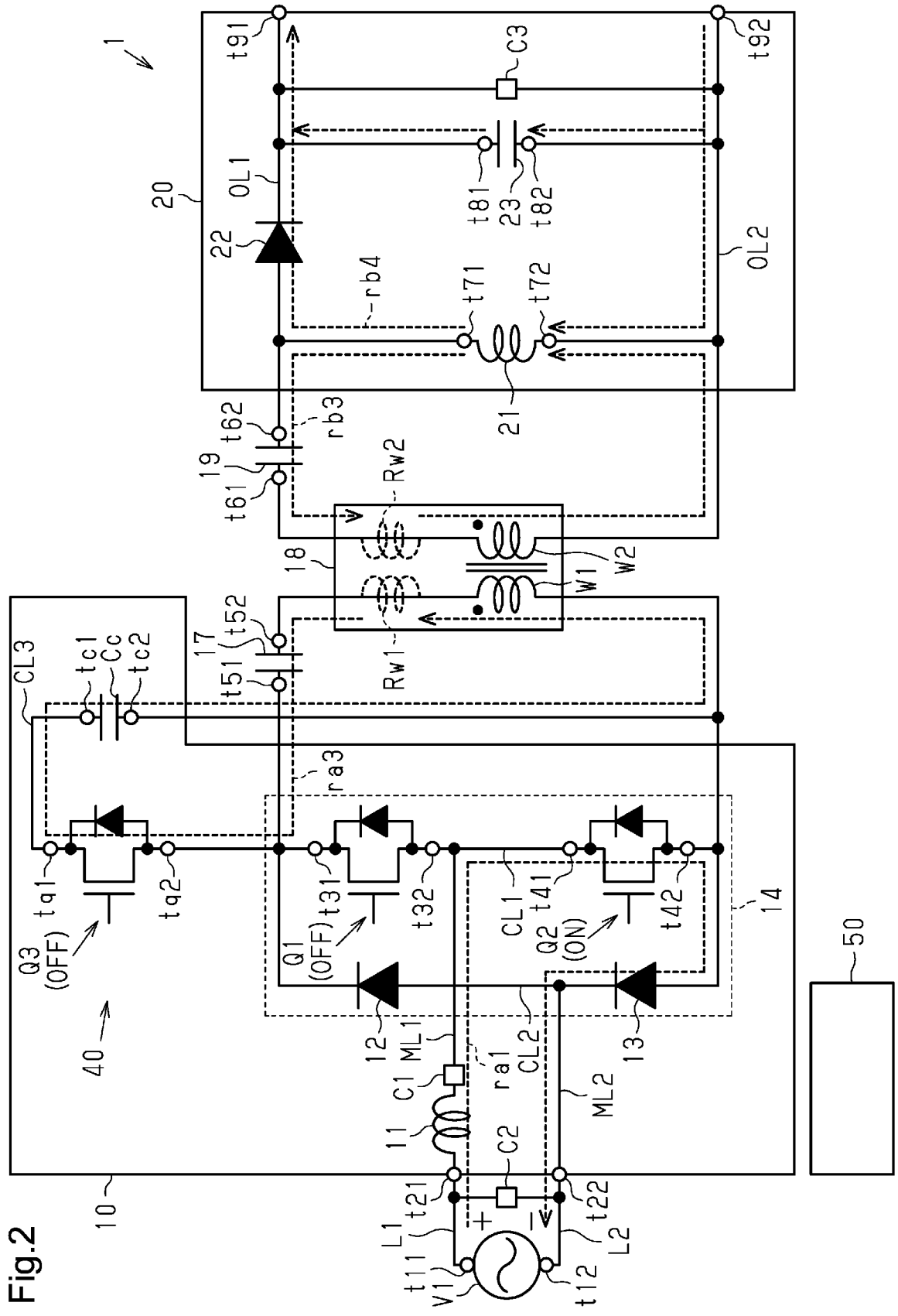
FIG. 2 is a circuit diagram showing the power conversion device 1 in a second state.

In the second state φ2, which is illustrated in FIG. 2, the controller 50 controls the switching pattern to the second pattern P2. As shown in FIG. 2, in the second state φ2, on the primary side of the power conversion device 1, current flows through the current path ra1 and a current path ra3. The current path ra3 is formed by the continuity of current of a leakage inductance Rw1 of the primary winding W1.

The current path ra3 runs from the leakage inductance Rw1 of the primary winding W1 through the first capacitor 17, the body diode of the buffer switching element Q3, and the buffer capacitor Cc to the leakage inductance Rw1. In the second state φ2, the current flowing through the primary winding W1 flows through the body diode of the buffer switching element Q3 to the buffer capacitor Cc to charge the buffer capacitor Cc. This causes the voltage across the buffer capacitor Cc to be applied to the primary winding W1. Before and after control to the second state φ2, the direction of the voltage applied to the primary winding W1 is reversed. Thus, the current flowing through the primary winding W1 decreases rapidly.

In the second state tp2, on the secondary side of the power conversion device 1, current flows through the second inductor 21, a current path rb3, and a current path rb4. The current path rb3 is formed by the continuity of current of a leakage inductance Rw2 of the secondary winding W2.

The current path rb3 runs from the leakage inductance Rw2 of the secondary winding W2 via the second inductor 21 and the second capacitor 19 to the leakage inductance Rw2 of the secondary winding W2. In the second state φ2, as the current flowing through the primary winding W1 decreases, the current flowing through the secondary winding W2 decreases.

The current path rb4 includes a first path from the second inductor 21 to the load and a second path from the output capacitor 23 to the load. The first path of the current path rb4 runs from the first terminal t71 of the second inductor 21 through the secondary diode 22, the first output terminal t91, the load connected to the power conversion device 1, and the second output terminal t92 to the second terminal t72 of the second inductor 21. As a result, current starts to flow through the secondary diode 22 and increases. That is, the primary winding W1 and the secondary winding W2 of the transformer 18 are magnetically coupled to each other in such a polarity that the secondary diode 22 becomes conductive when the AC voltage has a positive polarity, the upper arm switching element Q1 is in the non-conductive state, and the lower arm switching element Q2 is in the conductive state. The second path of the current path rb4 merges with the first path from the output capacitor 23. Thus, discharge current of the output capacitor 23 flows toward the load.

Third State φ3

Figure 3:
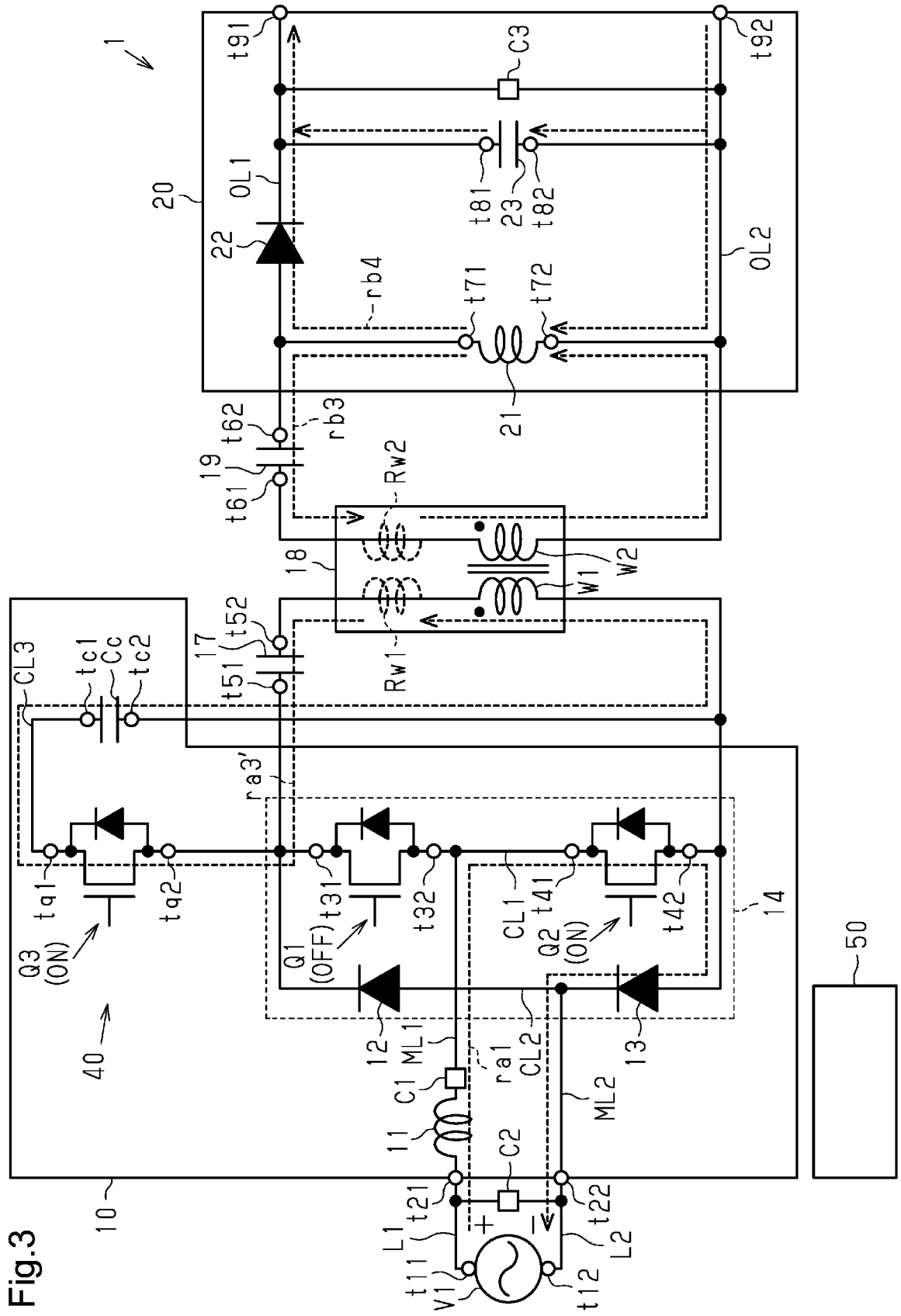
FIG. 3 is a circuit diagram showing the power conversion device 1 in a third state.

In the third state φ3, which is illustrated in FIG. 3, the controller 50 controls the switching pattern to the third pattern P3. As shown in FIG. 3, in the third state φ3, current flows through the current path ra1 and a current path ra3' on the primary side of the power conversion device 1. In the current path ra3', the current path ra3 passing through the body diode of the buffer switching element Q3 in the second state φ2 is replaced with the one passing through the drain-source section of the buffer switching element Q3 in the third state φ3. This allows the resistance of the current path ra3' to be smaller than that of the current path ra3. In the third state φ3, the current flowing through the current path ra1 continues to increase, and the current flowing through the primary winding W1 continues to decrease. In the third state φ3, the voltage across the buffer capacitor Cc is applied to the primary winding W1.

In the third state φ3, in the same manner as the second state φ2, current flows through the current paths rb3, rb4 on the secondary side of the power conversion device 1. In this case, the current flowing through the secondary winding W2 continues to decrease, and the current flowing through the secondary diode 22 continues to increase.

The period of the second state φ2 (in other words, the period in which the switching pattern is the second pattern P2) is a dead time period for preventing the buffer capacitor Cc from being short-circuited due to the switching elements Q1 to Q3 entering the conductive state at the same time. Thus, the period of the second state φ2 may be relatively short if there is time enough to control the lower arm switching elements Q2 to be completely in the non-conductive state. In other words, the period of the second state φ2 may be shorter than that of the first state φ1 or that of the third state φ3 if all the switching elements Q1 to Q3 enter the conductive state and the buffer capacitor Cc is not in a short-circuited state during the transition period from the first state φ1 (the first pattern P1) to the third state φ3 (the third pattern P3).

Fourth State φ4

Figure 4:
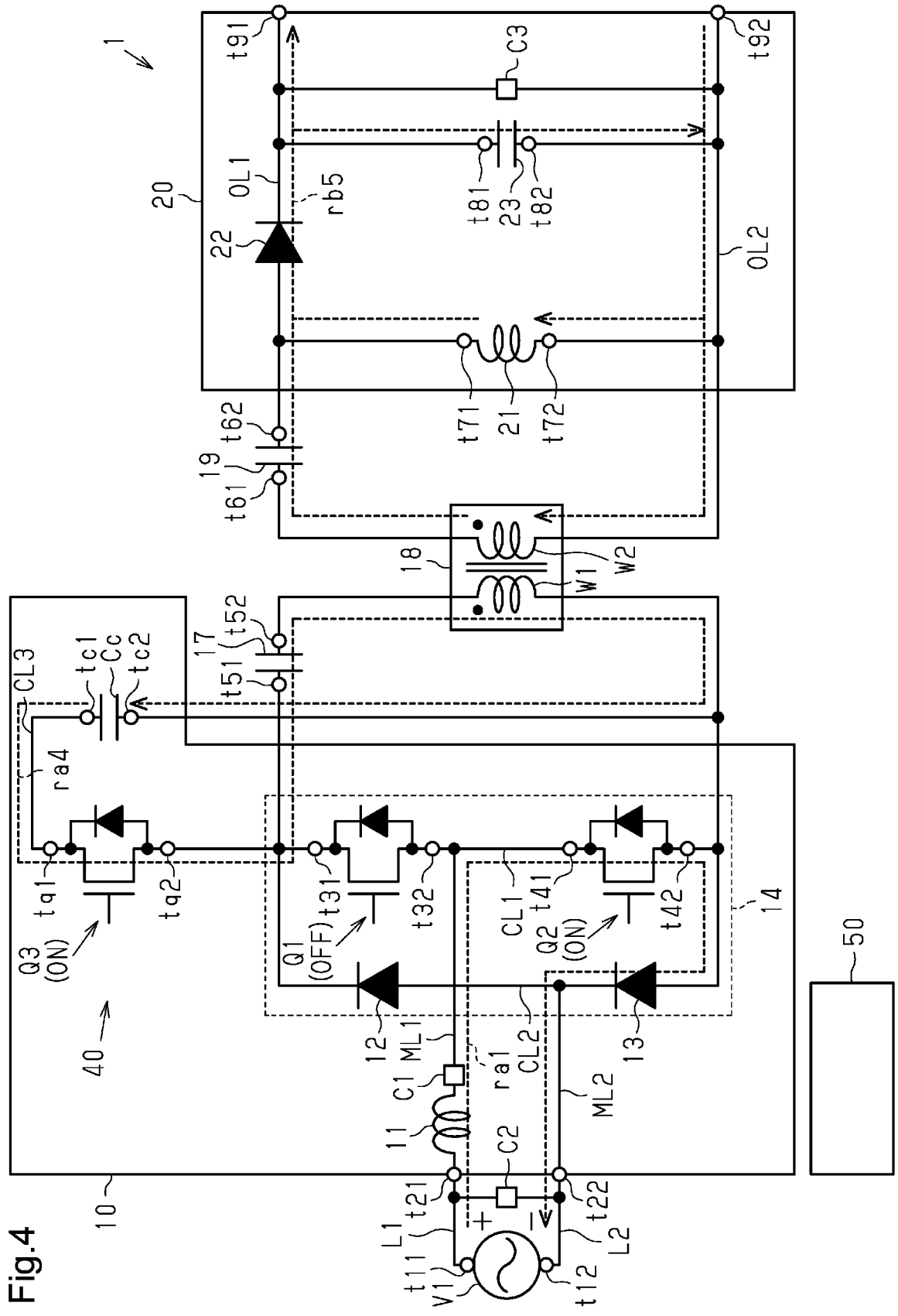
FIG. 4 is a circuit diagram showing the power conversion device 1 in a fourth state.

In the fourth state φ4, which is illustrated in FIG. 4, a predetermined time has elapsed since the transition of the controller 50 to the third state φ3. As shown in FIG. 4, in the fourth state φ4, current flows through the current path ra1 and a current path ra4 on the primary side of the power conversion device 1.

The current path ra4 runs from the terminal tc1 of the buffer capacitor Cc through the buffer switching element Q3, the first capacitor 17, and the primary winding W1 to the terminal tc2 of the buffer capacitor Cc. When the current flowing through the primary winding W1 decreases and the energy stored in the leakage inductance Rw1 of the primary winding W1 disappears, the current resulting from the discharge of the buffer capacitor Cc flows through the current path ra4. This changes the direction of the current flowing through the primary winding W1 and increases the current. In the fourth state φ4, e voltage across the buffer capacitor Cc is applied to the primary winding W1.

In the fourth state φ4, current flows through a current path rb5 on the secondary side of the power conversion device 1. The current path rb5 includes two paths. One runs from the starting end of the secondary winding W2 through the second capacitor 19, the secondary diode 22, the first output terminal t91, the load connected to the power conversion device 1, and the second output terminal t92 to the finishing end of the secondary winding W2. The other runs from the first terminal t71 of the second inductor 21 through the secondary diode 22, the first output terminal t91, the load connected to the power conversion device 1, and the second output terminal t92 to the second terminal t72 of the second inductor 21.

In the fourth state φ4, a total current of the current flowing through the secondary winding W2 and the current flowing through the second inductor 21 flows through the secondary diode 22. In the fourth state φ4, the current flowing through the second inductor 21 is substantially constant, whereas the current flowing through the secondary winding W2 increases. Thus, the current flowing through the secondary diode 22 in the fourth state φ4 increases. In the fourth state φ4, some of the current flowing through the secondary diode 22 flows to the output capacitor 23. Thus, the output capacitor 23 is charged.

Fifth State φ5

Figure 5:
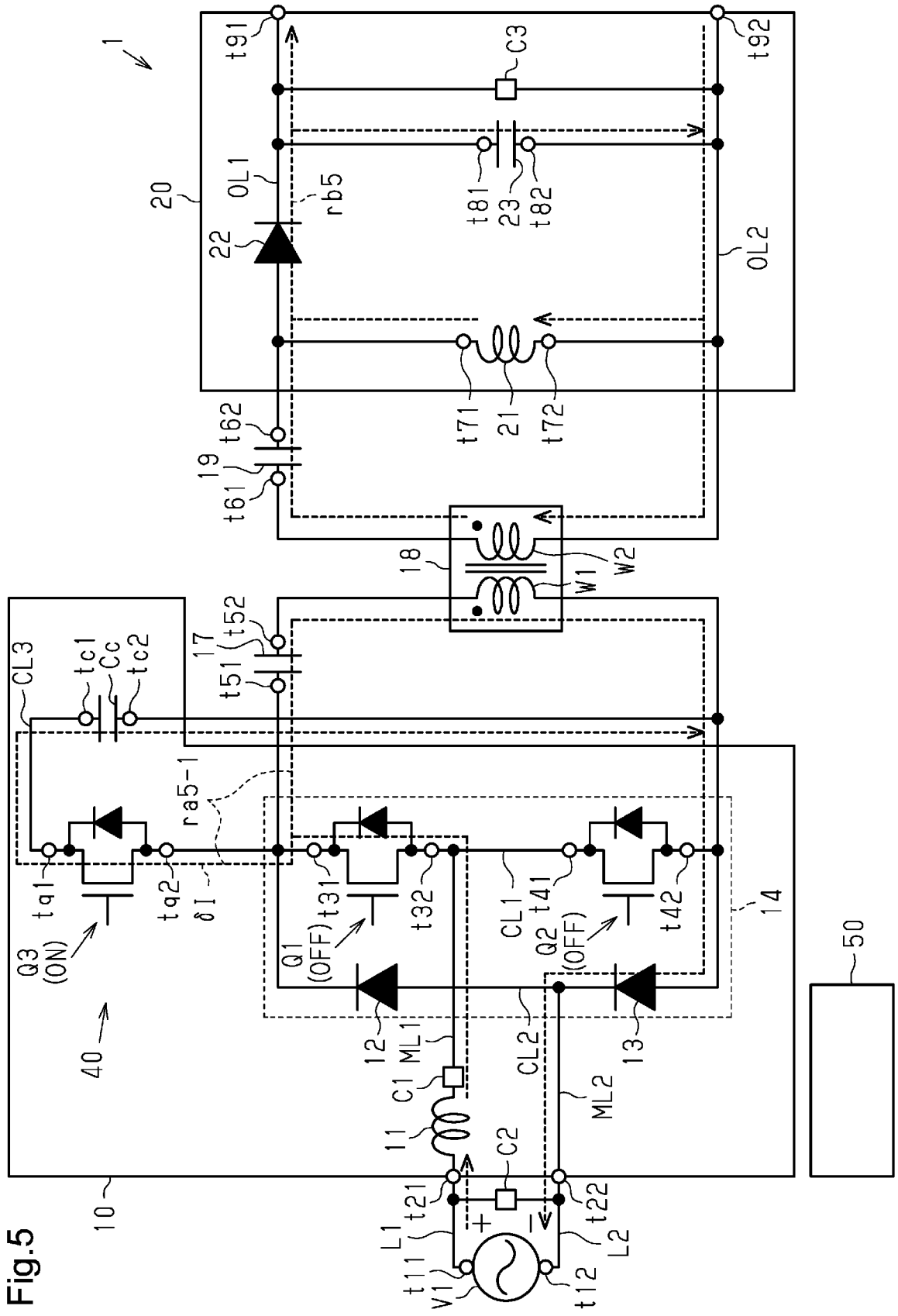
FIG. 5 is a circuit diagram showing the power conversion device 1 in a state 5-1.
Figure 6:
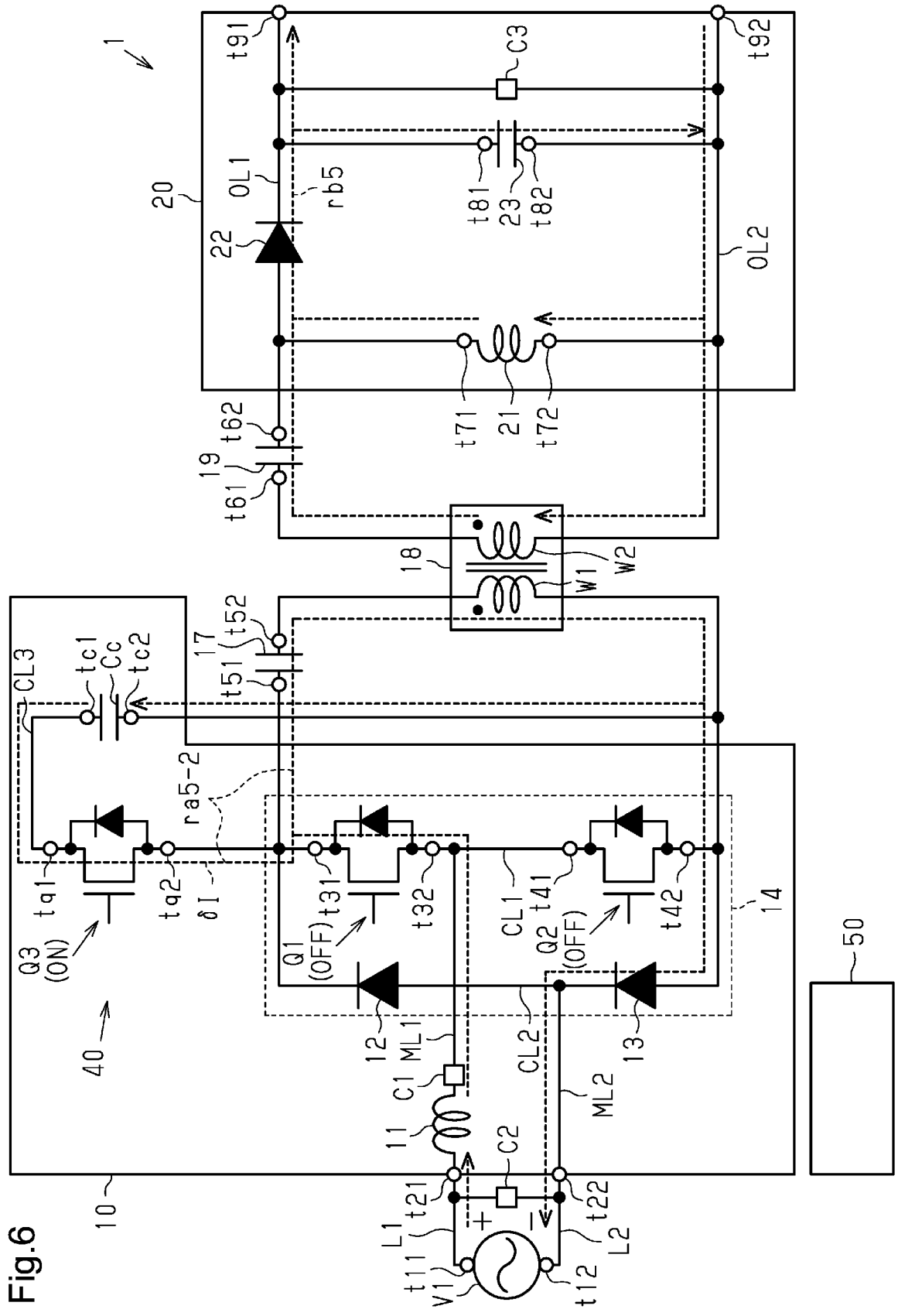
FIG. 6 is a circuit diagram showing the power conversion device 1 in a state 5-2.

In the fifth state φ5, which is illustrated in FIGS. 5 and 6, the controller 50 controls the switching pattern to the fourth pattern P4. The fifth state φ5 changes the direction of current flowing through the buffer switching element Q3 and the buffer capacitor Cc based on the magnitude relationship of the current flowing through the first inductor 11 and the current flowing through the primary winding W1. Thus, the fifth state φ5 in which the current flowing through the first inductor 11 is larger than the current flowing through the primary winding W1 is referred to as a state 5-1 φ5(1). The fifth state φ5 in which the current flowing through the first inductor 11 is smaller than the current flowing through the primary winding W1 is referred to as a state 5-2 φ5(2).

The relationship in magnitude of the current flowing through the first inductor 11 and the current flowing through the primary winding W1 at the time of transition to the fifth state φ5 can vary. Thus, the fourth state φ4 may transition to the state 5-1 φ5(1), and the fourth state φ4 may transition to the state 5-2 φ5(2). Additionally, the state 5-1 φ(1) may transition to the state 5-2 φ5(2) and then transition to the sixth state φ6.

State 5-1 φ5(1)

As shown in FIG. 5, in the state 5-1 φ5(1), current flows through a current path ra5-1 on the primary side of the power conversion device 1.

The current path ra5-1 includes a first path and a second path. The first path runs from the first inductor 11 through the body diode of the upper arm switching element Q1, the first capacitor 17, the primary winding W1, the lower arm diode 13, the second input terminal t22, the AC power supply V1, and the first input terminal t21 to the first inductor 11.

The second path runs from the first inductor 11 through the body diode of the upper arm switching element Q1, the buffer switching element Q3, the buffer capacitor Cc, the lower arm diode 13, the second input terminal t22, the AC power supply V1, and the first input terminal t21 to the first inductor 11. A difference δI between the current flowing through the first inductor 11 and the current flowing through the primary winding W1 flows through the second path. Thus, the buffer capacitor Cc is charged.

When the fourth state φ4 transitions to the state 5-1 φ5(1), the direction of the voltage applied to the first inductor 11 is reversed so that the current flowing through the first inductor 11 starts to decrease. Since the voltage across the buffer capacitor Cc continues to be applied to the primary winding W1, the current flowing through the primary winding W1 continues to increase.

In the state 5-1 φ5(1), current flows through the current path rb5 on the secondary side of the power conversion device 1. The current path rb5 has already been described. In the state 5-1 φ5(1), since the current flowing through the secondary winding W2 continues to increase, the current flowing through the secondary diode 22 continues to increase.

State 5-2 φ5(2)

As shown in FIG. 6, in the state 5-2 φ5(2), current flows through a current path ra5-2 on the primary side of the power conversion device 1. The current path ra5-2 includes a first path and a second path. The first path of the current path ra5-2 is the same as that of the current path ra5-1. The second path of the current path ra5-2 runs from the buffer capacitor Cc through the buffer switching element Q3, the first capacitor 17, and the primary winding W1 back to the buffer capacitor Cc. Due to the discharge of the buffer capacitor Cc, the difference δI between the current flowing through the first inductor 11 and the current flowing through the primary winding W1 flows through the second path.

When the fourth state φ4 transitions to the state 5-2 φ5(2), the direction of the voltage applied to the first inductor 11 is reversed so that the current flowing through the first inductor 11 starts to decrease. Since the voltage across the buffer capacitor Cc continues to be applied to the primary winding W1, the current flowing through the primary winding W1 continues to increase. When the state 5-1 φ5(1) transitions to the state 5-2 φ5(2), the current flowing through the first inductor 11 continues to decrease and the current flowing through the primary winding W1 continues to increase.

In the state 5-2 φ5(2), current flows through the current path rb5 on the secondary side of the power conversion device 1. The current path rb5 has already been described. In the state 5-2 φ5(2), since the current flowing through the secondary winding W2 continues to increase, the current flowing through the secondary diode 22 continues to increase.

Sixth State φ6

Figure 7:
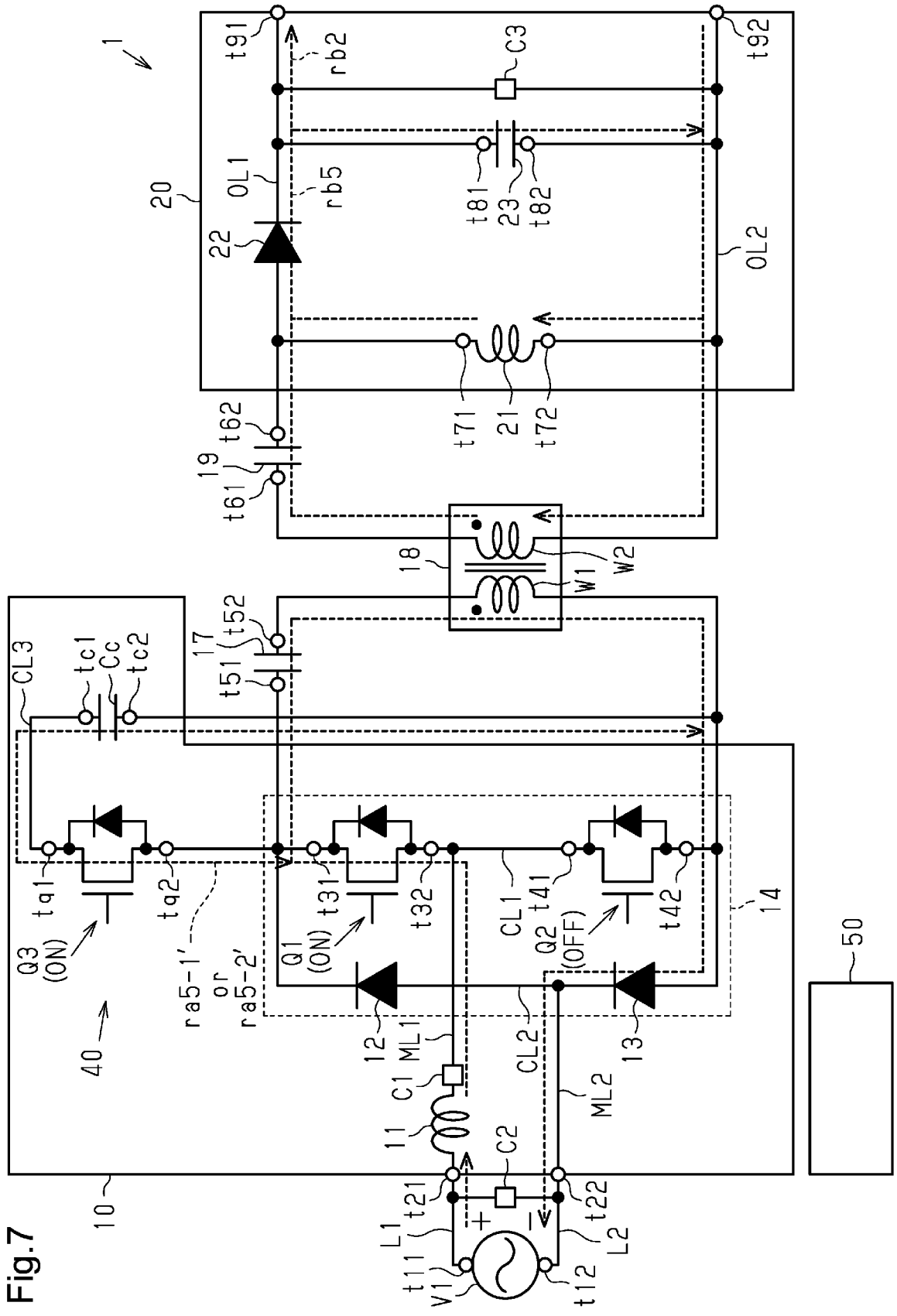
FIG. 7 is a circuit diagram showing the power conversion device 1 in a sixth state.

In the sixth state φ6, which is illustrated in FIG. 7, the controller 50 controls the switching pattern to the fifth pattern P5. As illustrated in FIG. 7, in the sixth state φ6, on the primary side of the power conversion device 1, current flows through a current path ra5-1' or a current path ra5-2' based on the relationship in magnitude of the current flowing through the first inductor 11 and the current flowing through the primary winding W1.

In the current path ra5-1', the current path ra5-1 passing through the body diode of the upper arm switching element Q1 is replaced with the one passing through the drain-source section of the upper arm switching element Q1. This allows the resistance of the current path ra5-1' to be smaller than that of the current path ra5-1.

Similarly, in the current path ra5-2', the current path ra5-2 passing through the body diode of the upper arm switching element Q1 is replaced with the one passing through the drain-source section of the upper arm switching element Q1. This allows the resistance of the current path ra5-2' to be smaller than that of the current path ra5-2.

In the sixth state φ6, current flows through the current path rb5 on the secondary side of the power conversion device 1. The current path rb5 has already been described. In the sixth state φ6, since the current flowing through the secondary winding W2 continues to increase, the current flowing through the secondary diode 22 continues to increase.

The period of the fifth state φ6 (in other words, the period in which the switching pattern is the fourth pattern P4) is a dead time period for preventing the buffer capacitor Cc from being short-circuited due to the switching elements Q1 to Q3 entering the conductive state at the same time. Thus, the period of the fifth state φ5 may be relatively short if there is time enough to control the lower arm switching elements Q2 to be completely in the non-conductive state. In other words, the period of the fifth state φ5 may be shorter than the period of the fourth state φ4 or the period of the sixth state φ6 if the switching elements Q1 to Q3 do not all enter the conductive state during the transition period from the fourth state φ4 (the third pattern P3) to the sixth state φ6 (the fifth pattern P5).

Seventh State φ7

Figure 8:
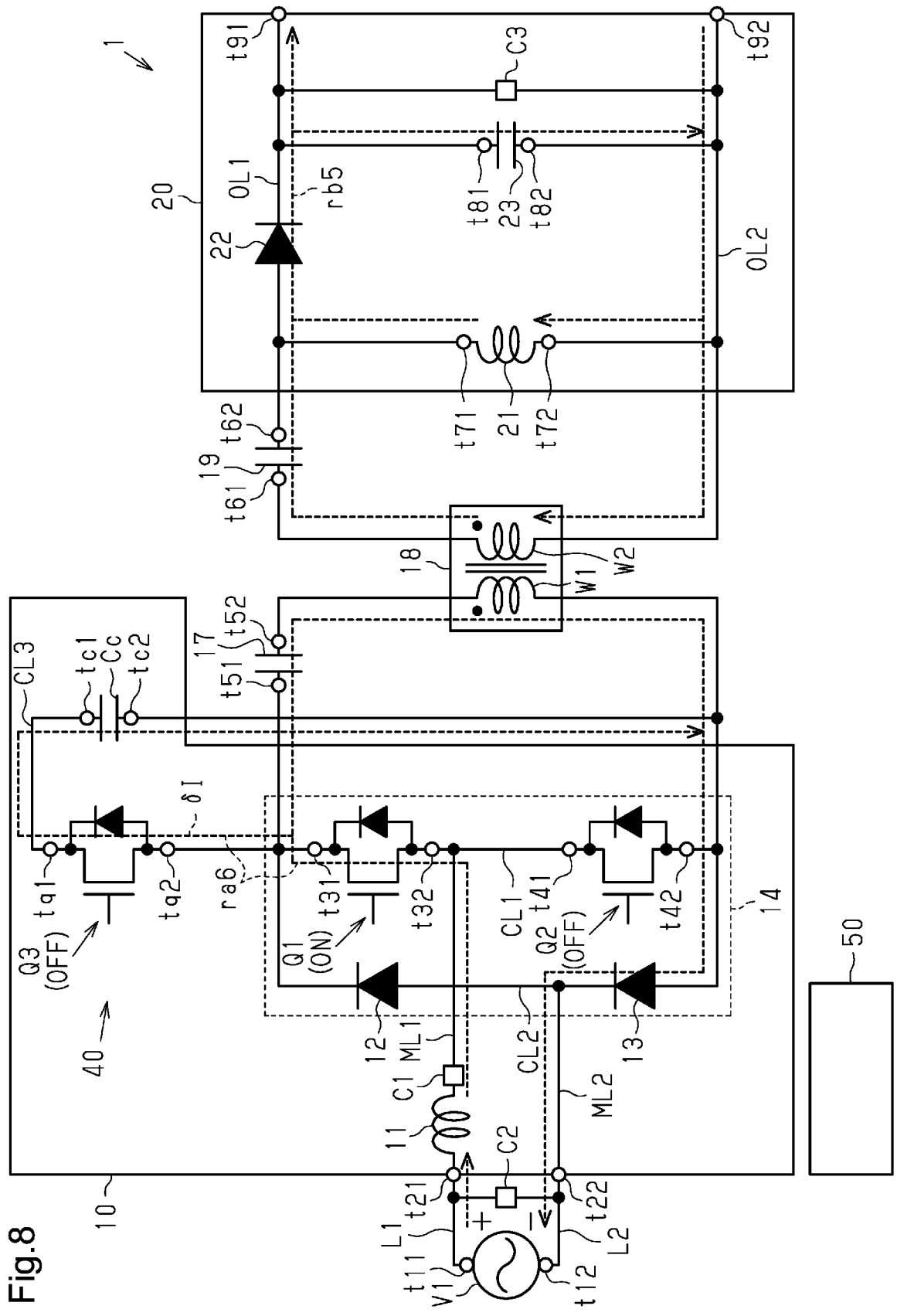
FIG. 8 is a circuit diagram showing the power conversion device 1 in a state 7-1.
Figure 9:
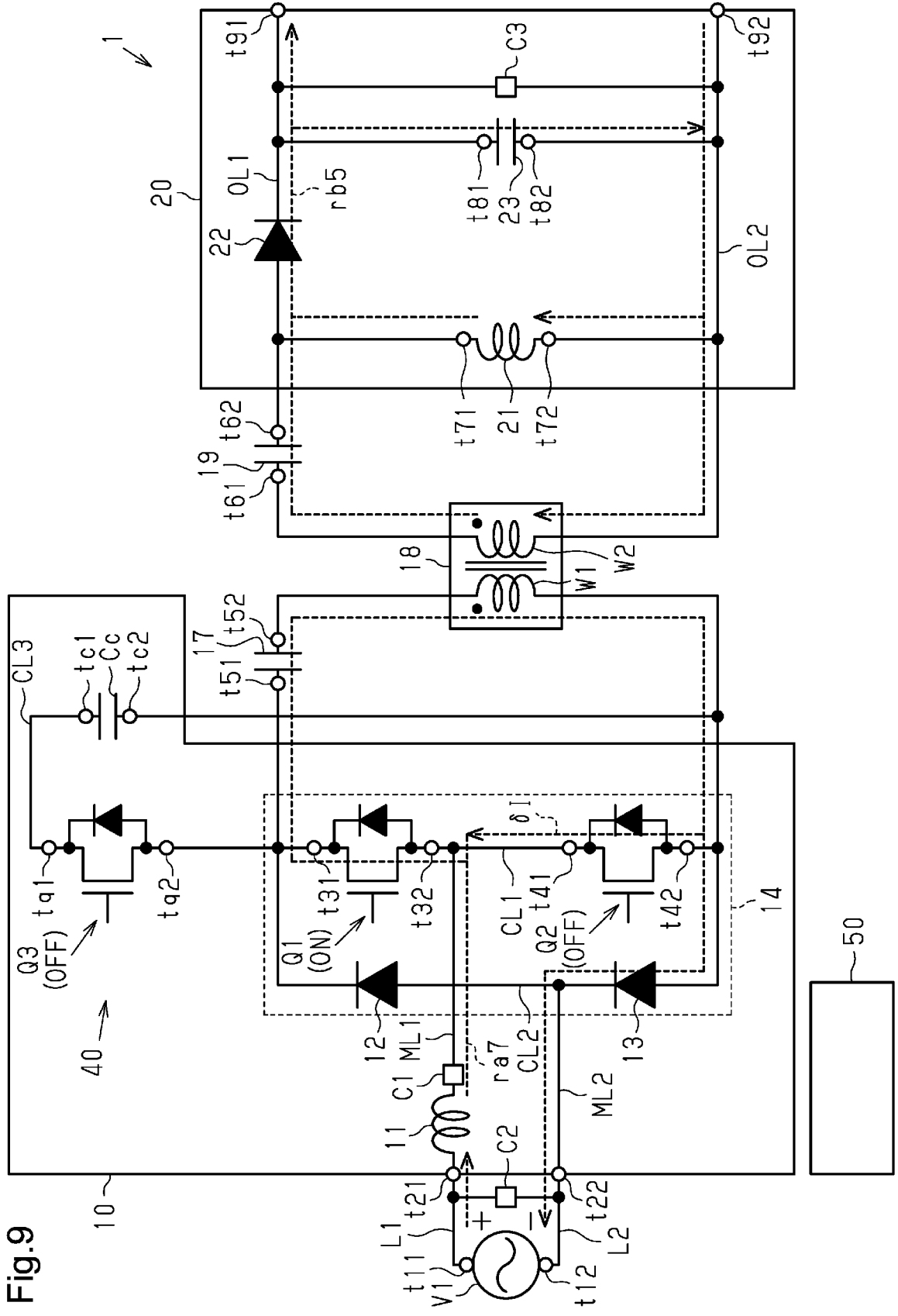
FIG. 9 is a circuit diagram showing the power conversion device 1 in a state 7-2.

In the seventh state φ7, which is illustrated in FIGS. 8 and 9, the controller 50 controls the switching pattern to the sixth pattern P6. The seventh state φ7 changes the direction of current flowing through the buffer switching element Q3 and the buffer capacitor Cc based on the relationship in magnitude of the current flowing through the first inductor 11 and the current flowing through the primary winding W1. Thus, the seventh state φ7 in which the current flowing through the first inductor 11 is larger than the current flowing through the primary winding W1 is referred to as a state 7-1 φ7(1). The seventh state φ7 in which the current flowing through the first inductor 11 is smaller than the current flowing through the primary winding W1 is referred to as a state 7-2 φ7(2).

The relationship in magnitude of the current flowing through the first inductor 11 and the current flowing through the primary winding W1 at the time of transition to the seventh state φ7 can vary. Thus, the sixth state φ6 may transition to the state 7-1 φ7(1), and the sixth state φ6 may transition to the state 7-2 φ7(2). Additionally, the state 7-1 φ7(1) may transition to the state 7-2 φ7(2) and then transition to the eighth state φ8.

State 7-1 φ7(1)

As shown in FIG. 8, in the state 7-1 φ7(1), current flows through a current path ra6 on the primary side of the power conversion device 1.

The current path ra6 includes a first path and a second path. The first path of the current path ra6 runs from the first inductor 11 through the drain-source section of the upper arm switching element Q1, the first capacitor 17, the primary winding W1, the lower arm diode 13, the second input terminal t22, the AC power supply V1, and the first input terminal t21 to the first inductor 11.

The second path of the current path ra6 runs from the first inductor 11 through the drain-source section of the upper arm switching element Q1, the drain-source section of the buffer switching element Q3, the buffer capacitor Cc, the lower arm diode 13, the second input terminal t22, the AC power supply V1, and the first input terminal t21 to the first inductor 11. The difference δI between the current flowing through the first inductor 11 and the current flowing through the primary winding W1 flows through the second path of the current path ra6. Thus, the buffer capacitor Cc is charged.

In the state 7-1 φ7(1), current flows through the current path rb5 on the secondary side of the power conversion device 1. The current path rb5 has already been described. In the state 7-1 φ7(1), since the current flowing through the secondary winding W2 continues to increase, the current flowing through the secondary diode 22 continues to increase.

State 7-2 φ7(2)

As illustrated in FIG. 9, in the state 7-2 φ7(2), in which the switching pattern is the sixth pattern P6 and the current flowing through the first inductor 11 is smaller than the current flowing through the primary winding W1, current flows through the current path raj on the primary side of the power conversion device 1.

The current path ra7 runs from the first inductor 11 through the drain-source section of the upper arm switching element Q1, the first capacitor 17, the primary winding W1, the lower arm diode 13, the second input terminal t22, the AC power supply V1, and the first input terminal t21 to the first inductor 11.

In the state 7-2 φ7(2), the difference δI between the current flowing through the first inductor 11 and the current flowing through the primary winding W1 flows through the body diode of the lower arm switching element Q2 to the drain-source section of the upper arm switching element Q1, the first capacitor 17, and the primary winding W1. As the sixth state φ6 or the state 7-1 φ7(1) transitions to the state 7-2 φ7(2), the direction of the voltage applied to the primary winding W1 is reversed. As a result, the current flowing through the primary winding W1 starts to decrease.

In the state 7-2 φ7(2), current flows through the current path rb5 on the secondary side of the power conversion device 1. The current path rb5 has already been described. However, in the state 7-2 φ7(2), as the current flowing through the primary winding W1 starts to decrease, the current flowing through the secondary winding W2 starts to decrease. Thus, the current flowing through the secondary diode 22 starts to decrease.

Eighth State φ8

Figure 10:
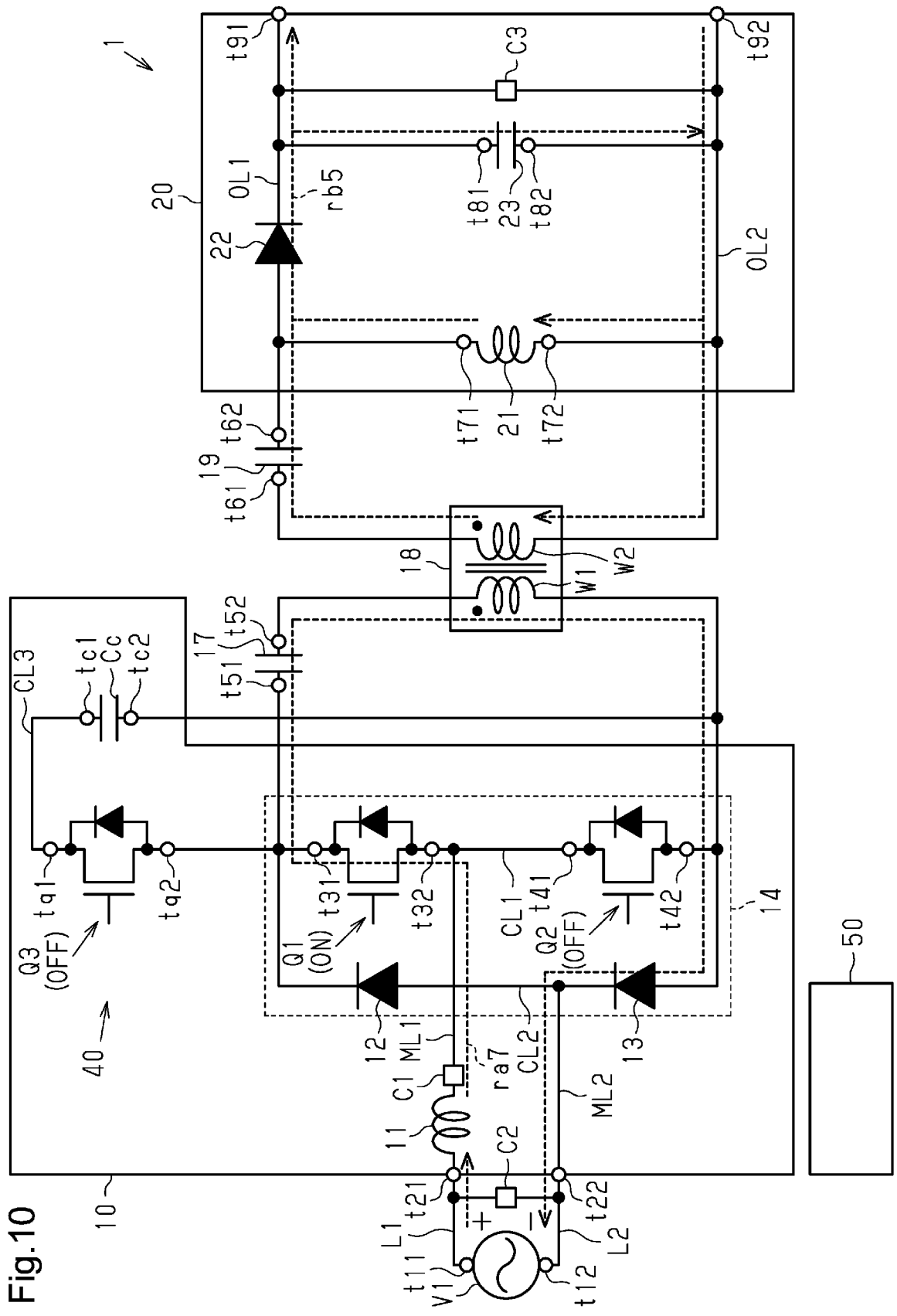
FIG. 10 is a circuit diagram showing the power conversion device 1 in an eighth state.

In the eighth state φ8, which is illustrated in FIG. 10, a predetermined time has elapsed since the controller 50 controlled the switching pattern to the sixth pattern P6. In the eighth state φ8, the current flowing through the first inductor 11 is equal to the current flowing through the primary winding W1.

As shown in FIG. 10, in the eighth state φ8, current flows through the current path ra7 on the primary side of the power conversion device 1. In this case, all the current flowing through the first inductor 11 flows through the primary winding W1. Thus, the difference δI flowing through the body diode of the lower arm switching element Q2 in the state 7-2 φ7(2) does not occur in the eighth state φ8. In the eighth state φ8, no voltage is applied to the primary winding W1. Thus, the current flowing through the primary winding W1 is constant.

In the eighth state φ8, current flows through the current path rb5 on the secondary side of the power conversion device 1. The current path rb5 has already been described. In the eighth state φ8, since the current flowing through the primary winding W1 is constant, the current flowing through the secondary winding W2 is constant. Thus, the current flowing through the secondary diode 22 is constant.

The period of the seventh state φ7 and the eighth state φ8 (in other words, the period in which the switching pattern is the sixth pattern P6) is a dead time period for preventing the buffer capacitor Cc from being short-circuited due to the switching elements Q1 to Q3 entering the conductive state at the same time. Thus, the period of the seventh state φ7 and the eighth state φ8 may be relatively short if there is time enough to control the buffer switching element Q3 to be completely in the non-conductive state. In other words, if the switching elements Q1 to Q3 do not all enter the conductive state during the transition period from the sixth state φ6 to the ninth state φ9, the total period of the seventh state φ7 and the eighth state φ8 may be shorter than the period of the sixth state φ6 or the ninth state φ9.

Ninth State φ9

Figure 11:
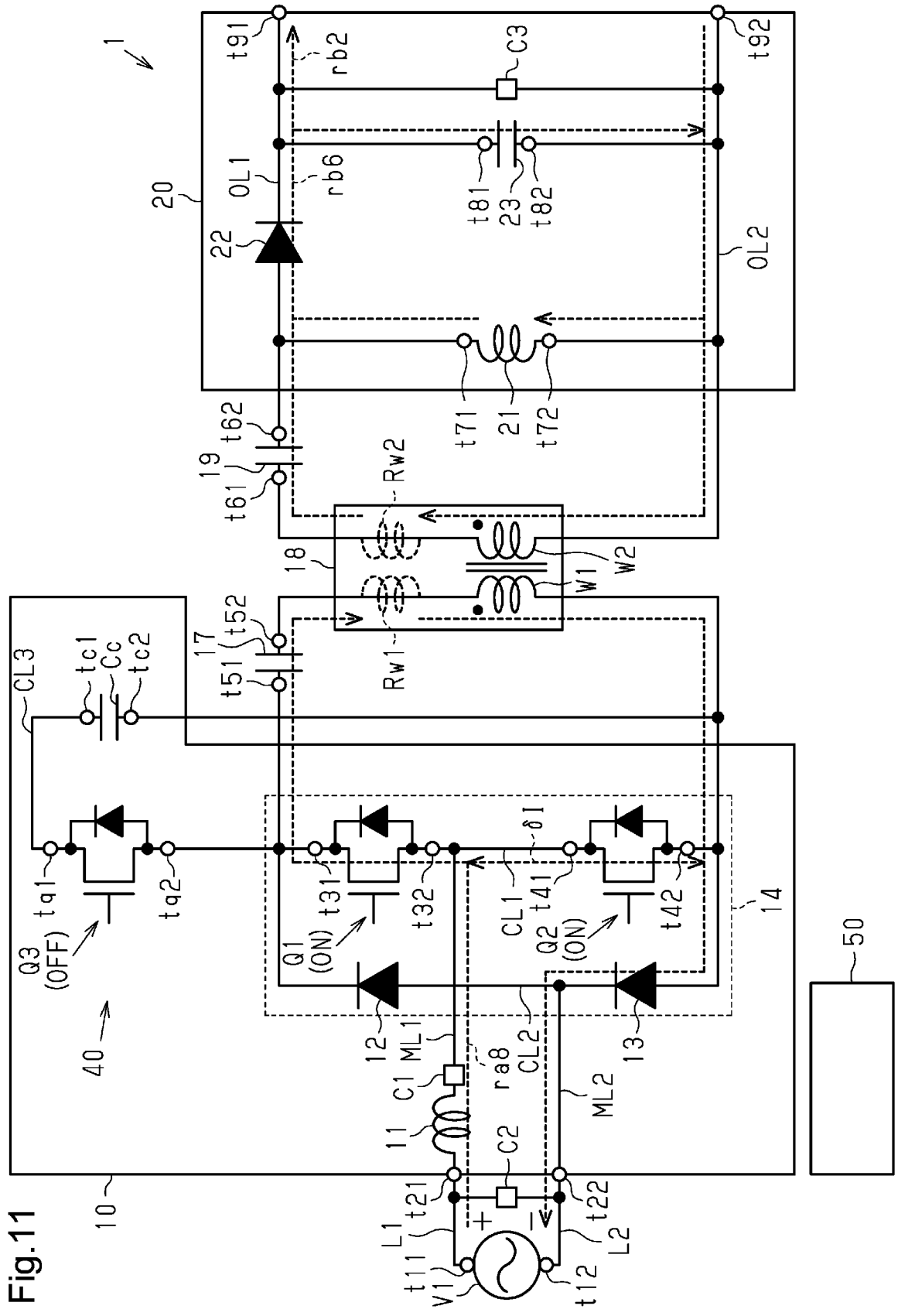
FIG. 11 is a circuit diagram showing the power conversion device 1 in a ninth state.

The ninth state φ9, which is illustrated in FIG. 11, is a state immediately after the controller 50 switches the switching pattern from the sixth pattern P6 to the first pattern P1.

As shown in FIG. 11, in the ninth state φ9, current flows through a current path ra8 on the primary side of the power conversion device 1. The current path ra8 runs from the leakage inductance Rw1 of the primary winding W1 through the primary winding W1, the lower arm diode 13, the second input terminal t22, the AC power supply V1, the first input terminal t21, the first inductor 11, the drain-source section of the upper arm switching element Q1, and the first capacitor 17 to the leakage inductance Rw1. In the ninth state φ9, the current flowing through the first inductor 11 increases while the current flowing through the primary winding W1 decreases. On the primary side of the power conversion device 1, the difference δI between the current flowing through the first inductor 11 and the current flowing through the primary winding W1 flows through the lower arm switching element Q2.

In the ninth state φ9, current flows through the current path rb6 on the secondary side of the power conversion device 1. The current path rb6 includes two paths. One runs from the leakage inductance Rw2 of the secondary winding W2 through the second capacitor 19, the secondary diode 22, the first output terminal t91, the load connected to the power conversion device 1, the second output terminal t92, and the secondary winding W2 to the leakage inductance Rw2. The other runs from the first terminal t71 of the second inductor 21 through the secondary diode 22, the first output terminal t91, the load connected to the power conversion device 1, the second output terminal t92, and the secondary winding W2 to the second terminal t72 of the second inductor 21.

In the ninth state φ9, since the current flowing through the primary winding W1 decreases, the current flowing through the secondary winding W2 decreases. Thus, the current flowing through the secondary diode 22 decreases. In the ninth state φ9, some of the current flowing through the secondary diode 22 flows to the output capacitor 23. Thus, the output capacitor 23 is charged.

When a predetermined time elapses from the ninth state φ9, the direction of the current flowing through the primary winding W1 is reversed. Then, the direction of the current flowing through the secondary winding W2 is reversed. As a result, the difference δI between the current flowing through the secondary winding W2 and the current flowing through the second inductor 21 flows through the secondary diode 22 so that the current flowing through the secondary diode 22 continues to decrease. Then, when the current flowing through the secondary winding W2 is equal to the current flowing through the second inductor 21, the current flowing through the secondary diode 22 disappears and the state returns to the first state φ1.

As described above, in the operation in a state in which the AC potential is negative, the operations of the upper arm switching elements Q1 and the lower arm switching elements Q2 are switched in correspondence with polarity inversion. For example, the third pattern P3 in a case in which the AC potential is in a negative state is a switching pattern in which the lower arm switching element Q2 is in the non-conductive state and the upper arm switching element Q1 and the buffer switching element Q3 are in the conductive state. That is, when the AC voltage input from the AC power supply V1 has a negative polarity, the controller 50 of the present embodiment controls switching to sequentially switch between multiple switching patterns including the third pattern P3.

When the positive and negative potentials of AC current are considered comprehensively, the third pattern P3 can be described as a switching pattern in which one of the two arm switching elements Q1, Q2 is in the non-conductive state and the other of the two arm switching elements Q1, Q2 and the buffer switching elements Q3 are in the conductive state.

Figure 12:
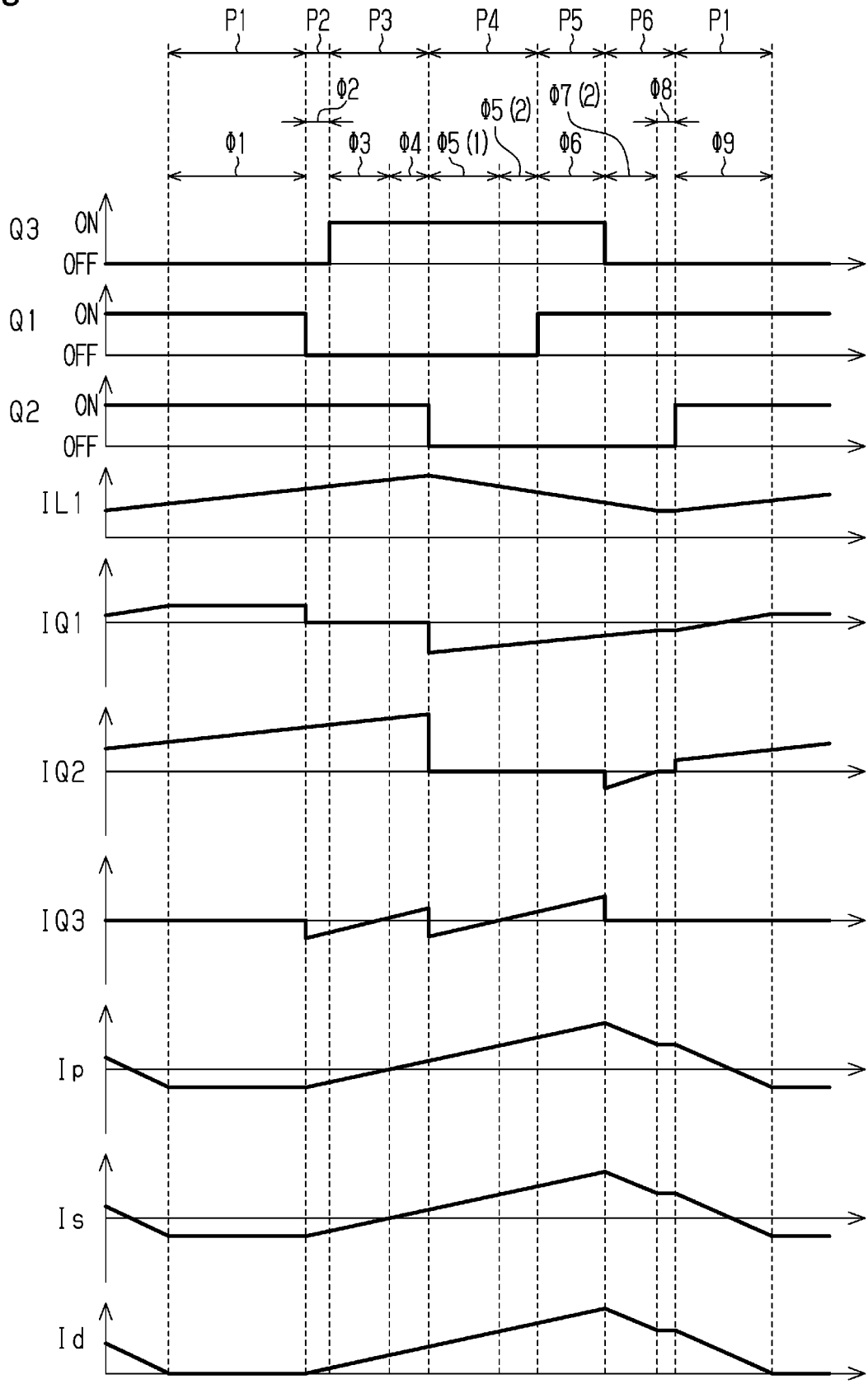
FIG. 12 is a graph schematically showing the state of each switching element and a change in a corresponding current during one cycle.

The operation of the present embodiment will now be described with reference to FIG. 12. FIG. 12 is a graph showing the states of the switching elements Q1 to Q3 and changes in the currents in one cycle. In FIG. 12, IL1 represents the current flowing through the first inductor 11, IQ1 to IQ3 respectively represent the currents flowing through the switching elements Q1 to Q3, Ip represents the current flowing through the primary winding W1, Is represents the current flowing through the secondary winding W2, and Id represents the current flowing through the secondary diode 22. To facilitate understanding, FIG. 12 illustrates a transition from the sixth state φ6 to the state 7-2 φ7(2).

As shown in FIG. 12, the power conversion device 1 sequentially transitions from the first state φ1 to the ninth state φ9 due to the switching patterns of each switching element Q1 to Q3 switching from the first pattern P1 through the patterns P2 to P6 to the first pattern P1. Thus, the power conversion device 1 performs power conversion. That is, the AC voltage of the AC power supply V1 is converted into DC voltage.

Particularly, in the second state φ2 to the third state φ3, the direction of the current in the first inductor 11 and the direction of the current in the leakage inductance Rw1 of the primary winding W1 are opposite to each other. Thus, it is difficult to provide the continuity of the currents of the two inductors when the buffer circuit 40 is not provided. As a result, surge voltages may occur. In the present embodiment, the buffer circuit 40 limits the occurrence of the surge voltages by supplying the currents in the two inductors to the buffer capacitor Cc. In the fourth state φ4 to the sixth state φ6, the buffer circuit 40 absorbs the difference δI between the current flowing through the first inductor 11 and the current flowing through the primary winding W1, and discharges the absorbed energy.

As shown in FIG. 12, in the present embodiment, the state transitions from the first state φ1 through the second state φ2, which is a dead time, to the third state φ3, in which the lower arm switching element Q2 and the buffer switching element Q3 are in the conductive state. As a result, the voltage across the buffer capacitor Cc is applied to the primary winding W1, and current starts to flow through the secondary diode 22. Even when the lower arm switching element Q2 is in the conductive state, there is a period in which current flows through the secondary diode 22.

In such a configuration, the period from the second state $\varphi 2$ to the sixth state $\varphi 6$ may be set such that the amount of current flowing through the secondary diode 22 (electric charge passing through the secondary diode 22) in one cycle is constant. In this case, since the power supplied to the output capacitor 23 and the load is substantially constant regardless of the value of the input voltage, the ripple of the output voltage is reduced.

Control by Controller 50

The present embodiment allows the controller 50 to control switching based on the current flowing through the first inductor 11 and the input voltage so that the power factor of the input power is corrected. For example, the controller 50 controls the times of the first state $\varphi 1$ and the ninth state $\varphi 9$ so that the bridge circuit 14 operates as a power factor correction (PFC) circuit. In the first state $\varphi 1$ and the ninth state $\varphi 9$, the AC power supply V1 and the first inductor 11 form a closed circuit, and the current from the AC power supply V1 is limited by the first inductor 11. An increase in the current flowing through the first inductor 11 is proportional to the duration of the first state $\varphi 1$ and the ninth state $\varphi 9$. Thus, the current in the first inductor 11 can be controlled by controlling the duration of the first state $\varphi 1$ and the ninth state $\varphi 9$. The controller 50 controls the duration of the first state $\varphi 1$ and the ninth state $\varphi 9$ based on the signals from the current sensor C1 and the voltage sensor C2 so that the waveform of the current flowing through the first inductor 11 becomes substantially sinusoidal and the frequencies and phases of the sinusoidal waves match the frequencies and phases of the AC power supply V1.

If the operation of the buffer switching element Q3 and the operations of the two arm switching elements Q1, Q2 are synchronized with each other (i.e., if there is no third pattern P3, which corresponds to the specific pattern), the period during which the buffer switching element Q3 is in the conductive state is determined by a PFC operation. This limits adjustment of the period during which the buffer switching element Q3 is in the conductive state. Accordingly, it is difficult to control the amount of current passing through the secondary diode 22. In the present embodiment, the third pattern P3, which corresponds to the specific pattern, is set. This facilitates the adjustment of the period during which the buffer switching element Q3 is in the conductive state. Thus, the amount of current passing through the secondary diode 22 can be controlled while performing the PFC operation. This corrects the power factor and reduces the ripple of the output voltage.

The controller 50 can also perform switching control so that a predetermined DC voltage is output based on the detection result of the voltage sensor C3. Specifically, the controller 50 controls the duty cycle of the two arm switching elements Q1, Q2 based on, for example, the difference between the output voltage detected by the voltage sensor C3 and the predetermined DC voltage (target voltage). Further, the controller 50 can simultaneously correct the power factor of the input power and control the output voltage.

Advantages of Power Conversion Device 1 of Present Embodiment

The above embodiment has the following advantages.

(1) When the controller 50 controls the switching of the switching elements Q1 to Q3 depending on the polarity of the AC power supply V1, the power conversion device 1 transitions to the first state $\varphi 1$ to the ninth state $\varphi 9$. Thus, the bridge circuit 14 converts the AC voltage of the AC power supply V1 into DC voltage.

At the same time, the switching operation of the upper arm switching element Q1 and the lower arm switching element Q2 are performed to apply a high-frequency AC voltage to the primary winding W1 of the transformer 18. As a result, power is transmitted to the secondary side of the transformer 18 through the transformer 18 while being insulated.

In the power conversion device of Patent Literature 1, conversion from AC voltage to DC voltage and conversion from the converted DC voltage to a high-frequency AC voltage are performed by separate bridge circuits. In the power conversion device 1 of the present embodiment, conversion from AC to DC and conversion from the converted DC to a high-frequency AC are performed by one bridge circuit.

As a result, the power conversion device 1 reduces the number of active elements (e.g., switching elements and rectifier elements) as compared to a case in which a full-bridge circuit is used as a circuit in the power conversion device of Patent Literature 1. Additionally, the power conversion device 1 of the present embodiment has a smaller number of active elements through which current passes than the power conversion device of Patent Literature 1, which uses a full-bridge circuit, and thus reduces conduction loss in the active elements.

(2) The controller 50 includes the patterns P1 to P6 as switching patterns that are combinations of states of the switching elements Q1 to Q3. The controller 50 controls switching to sequentially switch between the patterns P1 to P6, including the third pattern P3 corresponding to the specific pattern. The third pattern P3 is a switching pattern in which one of the two arm switching elements Q1, Q2 is in the non-conductive state and the other of the two arm switching elements Q1, Q2 and the buffer switching elements Q3 are in the conductive state. This allows adjustment of the period during which the voltage across the buffer capacitor Cc is applied to the primary winding W1, thereby controlling the amount of current flowing through the secondary diode 22 (the amount of electric charge passing through the secondary diode 22) during one cycle.

Controlling the amount of current flowing through the secondary diode 22 in one cycle reduces the ripple of the output voltage. One of the factors causing the ripple of the output voltage is the difference between the input power and the output power. When the input current is controlled by the PFC operation to have a sinusoidal waveform that corresponds to the frequency and phase of the input voltage, the input power changes in a sinusoidal waveform at a frequency that is twice the frequency of the input voltage. The output power is often controlled to be constant, and the difference between the input power and the output power changes with time. If the amount of current flowing through the secondary diode 22 is not controlled, the surplus is stored in the output capacitor 23 when the input power is excessive, and the shortage is discharged from the output capacitor 23 when the input power is insufficient. Thus, ripple occurs in the output voltage.

In the present embodiment, the third pattern P3 is set. This allows the period during which the current flows through the secondary diode 22 in one cycle to be adjusted to some extent. Thus, the amount of current flowing through the secondary diode 22 is adjusted regardless of the input power, thereby limiting fluctuations in the output power. As a result, the ripple of the output voltage is reduced.

Further, since the specific pattern is included as the switching pattern, the control parameter of the power conversion device 1 is set to two values; namely, the duty of the upper arm switching element Q1 or the lower arm switching element Q2 and the duty of the buffer switching elements Q3. The use of two control parameters, for example, reduces the ripple of the output voltage while maintaining the performance of controlling the power factor and the output voltage.

(3) When the AC voltage input from the AC power supply V1 has a positive polarity, the third pattern P3 is a switching pattern in which the upper arm switching element Q1 is in the non-conductive state and the lower arm switching element Q2 and the buffer switching element Q3 are in the conductive state. As a result, when the AC voltage input from the AC power supply V1 has a positive polarity, the switching pattern is set to the third pattern P3 so that current flows through the secondary diode 22. Thus, advantage (2) is obtained.

(4) When the AC voltage input from the AC power supply V1 has a negative polarity, the third pattern P3 is a switching pattern in which the lower arm switching element Q2 is in the non-conductive state and the upper arm switching element Q1 and the buffer switching element Q3 are in the conductive state. As a result, when the AC voltage input from the AC power supply V1 has a negative polarity, the switching pattern is set to the third pattern P3 so that current flows through the secondary diode 22. Thus, advantage (2) is obtained.

(5) In the second state $\varphi 2$ to the third state $\varphi 3$, to provide continuity of the current in the first inductor 11 and continuity of the current in the leakage inductance Rw1 of the transformer 18, the buffer circuit 40 provides a bypass path for the two currents.

In such a configuration, the power conversion device 1 uses the buffer circuit 40 to limit surge voltages that may occur due to the mismatch between the continuity of the current in the first inductor 11 and the continuity of the current in the leakage inductance Rw1 of the transformer 18.

(6) The transformer 18 transmits power from the primary side to the secondary side in all of the second state $\varphi 2$ to the ninth state $\varphi 9$ regardless of the direction of the voltage applied to the starting end and the finishing end of the primary winding W1 of the transformer 18. Thus, the power conversion device 1 increases the utilization efficiency of the transformer 18.

(7) The buffer circuit 40 includes the buffer switching element Q3, which is provided between the two arm switching elements Q1, Q2 and the buffer capacitor Cc. When the current flowing through the first inductor 11 is larger than the current flowing through the primary winding W1, such a configuration not only charges the buffer capacitor Cc with the difference δI but also supplies current from the buffer capacitor Cc to the primary winding W1. As a result, the buffer capacitor Cc is properly discharged to limit an increase in the voltage across the buffer capacitor Cc. Further, the energy from the AC power supply V1 is output via the transformer 18 without waste.

Particularly, in the present embodiment, a switching element (e.g., a MOSFET) having an anti-parallel diode is used as the buffer switching element Q3. Thus, in a state in which an operation related to surge voltage is required (e.g., the third state $\varphi 3$), the resistance of the buffer switching element Q3 is reduced by bringing the buffer switching element Q3 into the conductive state. Accordingly, as compared to when only a diode is provided, heat generation or the like caused by the flow of surge voltage is limited. Further, discharge control from the buffer capacitor Cc can be performed by controlling the buffer switching element Q3. For example, in the fourth state $\varphi 4$, since the buffer switching element Q3 is in the conductive state, the discharge current in the buffer capacitor Cc can be supplied to the primary winding W1.

(8) The controller 50 controls switching based on the current flowing through the first inductor 11 and the input voltage from the AC power supply V1 to correct the power factor.

Such a configuration allows the power conversion device 1 to correct the power factor of the power supplied from the AC power supply V1.

(9) The controller 50 controls the switching of the upper arm switching element Q1, the lower arm switching element Q2, and the buffer switching element Q3 based on the voltage between the first output terminal t91 and the second output terminal t92 such that a predetermined DC voltage is output.

Such a configuration allows the power conversion device 1 to perform feedback control based on the voltage between the first output terminal t91 and the second output terminal t92 and bring the DC voltage output by the power conversion device 1 closer to the predetermined DC voltage (target voltage).

The above embodiment may be modified as follows. The above embodiment and each of the following examples may be combined with each other as long as there is no technical contradiction.

The switching pattern excluding a dead time is not limited to the first pattern P1, the third pattern P3, and the sixth pattern P6. For example, a switching pattern in which only the upper arm switching element Q1 is in the conductive state when the AC voltage has a positive polarity, or a switching pattern in which only the lower arm switching element Q2 is in the conductive state when the AC voltage has a negative polarity may be provided in addition to the dead time. That is, the specific pattern may be a pattern in which one of the two arm switching elements Q1, Q2 is in the conductive state and the other of the two arm switching elements Q1, Q2 and the buffer switching elements Q3 are in the non-conductive state.

The first state $\varphi 1$ may be continued until the AC voltage has a positive polarity and the lower arm switching element Q2 enters the non-conductive state. In this case, when the lower arm switching element Q2 enters the non-conductive state, only the upper arm switching element Q1 enters the conductive state (i.e., has the specific pattern). The current in the first inductor 11 flows through a path that passes through the upper arm switching element Q1, the body diode of the buffer switching element Q3, the buffer capacitor Cc, the lower arm diode 13, and the AC power supply V1, returning to the first inductor 11. The current in the leakage inductance Rw1 of the primary winding W1 flows through the first capacitor 17, the body diode of the buffer switching element Q3, and the buffer capacitor Cc, returning to the primary winding W1. The voltage across the buffer capacitor Cc is applied to the primary winding W1, and the voltage in a direction that is opposite to the direction before the lower arm switching element Q2 enters the non-conductive state is applied to the primary winding W1. Thus, the current flowing through the primary winding W1 decreases. As a result, current starts to flow through the secondary diode 22.

When the bridge circuit 14 is controlled to perform the PFC operation, the switching pattern may occur when the input voltage is low. After the switching pattern, when the buffer switching element Q3 is brought into the conductive state, the fifth state φ5 is obtained.

The operation in the state in which the AC voltage has a negative polarity is the same as the operation in the state in which the AC potential is positive, except that the operations of the two arm switching elements Q1, Q2 are reversed in response to polarity reversal and the current flows not through the lower arm diode 13 but through the upper arm diode 12.

Figure 13:
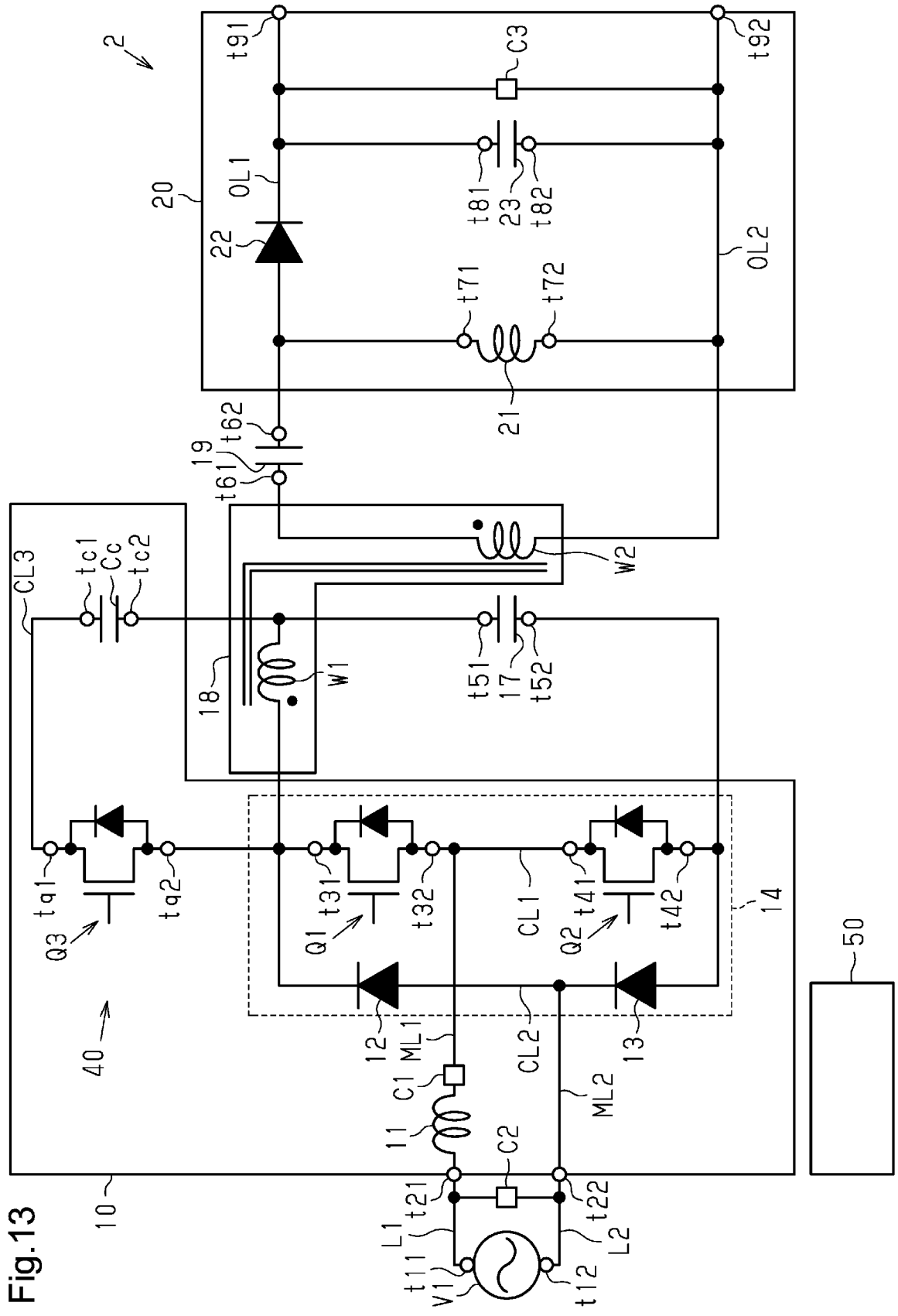
FIG. 13 is a circuit diagram showing a power conversion device 2 of a modification.

As shown in FIG. 13, the primary circuit 10, the first capacitor 17, the transformer 18, and the buffer circuit 40 may be connected to each other in a manner that is different from the manner in the above embodiment. Specifically, in a power conversion device 2 according to this modification, the starting end of the primary winding W1 is electrically connected to the cathode of the upper arm diode 12 and the first terminal t31 of the upper arm switching element Q1. The finishing end of the primary winding W1 is connected to the first terminal t51 of the first capacitor 17, and the second terminal t52 of the first capacitor 17 is connected to the cathode of the lower arm diode 13 and the second terminal t42 of the lower arm switching element Q2.

The terminal tq2 of the buffer switching element Q3 is connected to a connection point between the bridge circuit 14 (specifically, the cathode of the upper arm diode 12 and the first terminal t31) and the starting end of the primary winding W1. The terminal tc2 of the buffer capacitor Cc is connected to the finishing end of the primary winding W1 and to the first terminal t51 of the first capacitor 17. Thus, the buffer capacitor Cc is connected in series to the first capacitor 17.

In the power conversion device 2, the controller 50 sequentially switches the switching pattern from the first pattern P1 through the patterns P2 to P6 to the first pattern P1. As a result, the same advantages are obtained.

Further, in this modification, the buffer capacitor Cc is connected in series to the first capacitor 17. Thus, in the second state φ2 to the third state φ3, to provide continuity of the current in the first inductor 11 and continuity of the current in the leakage inductance Rw1 of the transformer 18, the buffer capacitor Cc and the first capacitor 17 provide a bypass path for the two currents. That is, the power conversion device 2 limits surge voltage using a combination of the buffer capacitor Cc and the first capacitor 17.

Further, in the power conversion device 2, the voltage applied across the buffer capacitor Cc in the power conversion device 1 is divided into the voltage applied to the first capacitor 17 and the voltage applied to the buffer capacitor Cc. Thus, the withstand voltage of the buffer capacitor Cc in this configuration is smaller than that of the buffer capacitor Cc used in the power conversion device 1.

The terminal tc2 of the buffer capacitor Cc does not have to be connected to the position described in this modification, and may be connected to, for example, the lower arm side of the bridge circuit 14 (specifically, the lower arm diode 13 and the second terminal t42). However, the voltage applied to the buffer capacitor Cc in this case is the same as that in the case of the power conversion device 1.

The second capacitor 19 does not have to be connected between the starting end of the secondary winding W2 and the cathode of the secondary diode 22. Instead, the second capacitor 19 may be connected between the finishing end of the secondary winding W2 and the anode of the secondary diode 22. Additionally, the second capacitor 19 may include two capacitors. In this case, the second capacitor 19 is connected between the starting end of the secondary winding W2 and the cathode of the secondary diode 22 and between the finishing end of the secondary winding W2 and the cathode of the secondary diode 22.

Figure 14:
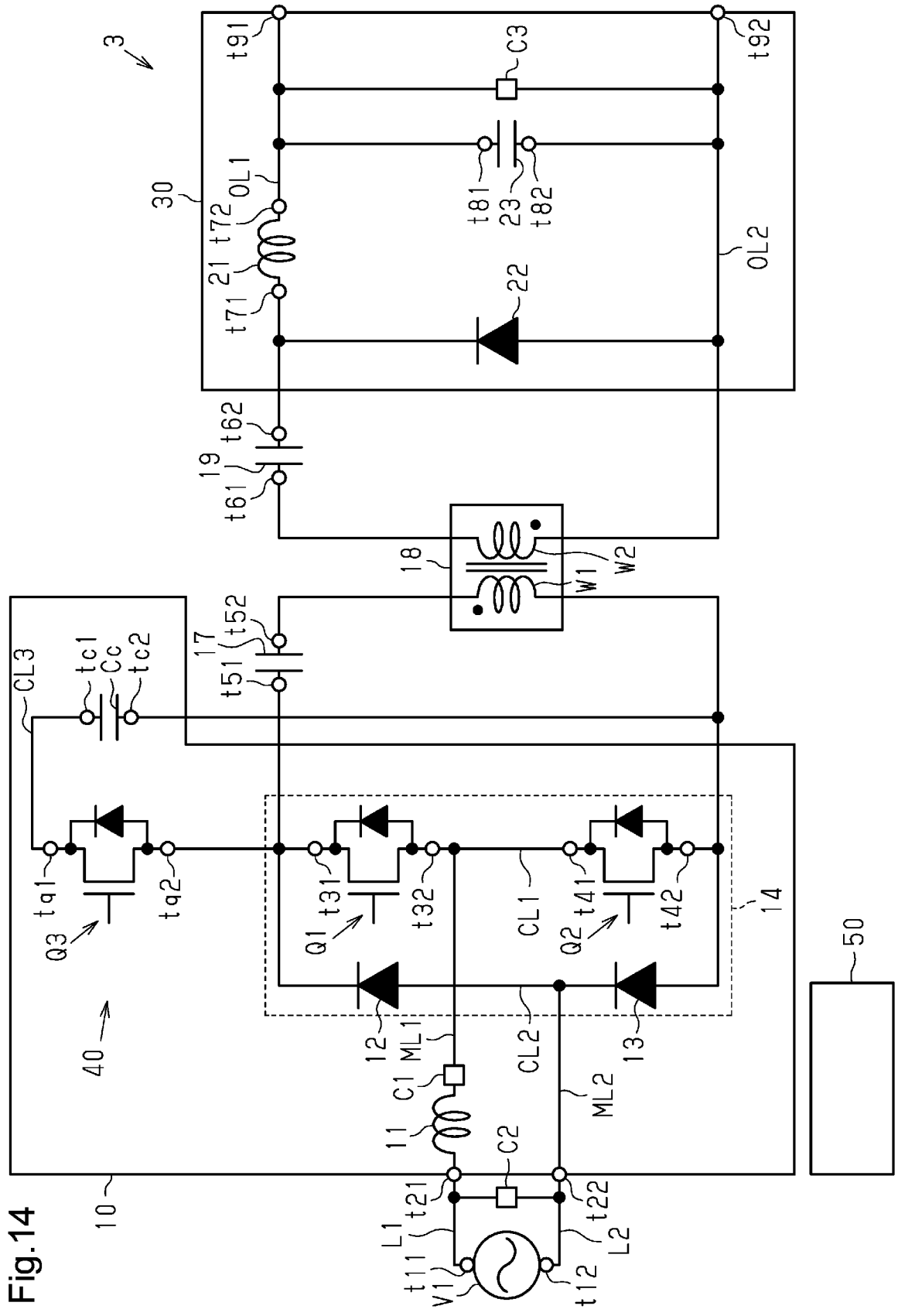
FIG. 14 is a circuit diagram showing a power conversion device 3 of another modification.

As shown in FIG. 14, a power conversion device 3 that includes a rectifying-smoothing circuit 30 instead of the rectifying-smoothing circuit 20 may be provided. The rectifying-smoothing circuit 30 includes the second inductor 21, the secondary diode 22, the output capacitor 23, the first output line OL1, the second output line OL2, the first output terminal t91, and the second output terminal t92.

The finishing end of the secondary winding W2 is electrically connected to the first terminal t71 of the second inductor 21 and the cathode of the secondary diode 22 via the second capacitor 19. Specifically, the finishing end of the secondary winding W2 is connected to the first terminal t61 of the second capacitor 19, and the second terminal t62 of the second capacitor 19 is connected to the first terminal t71 of the second inductor 21 and the cathode of the secondary diode 22. The starting end of the secondary winding W2 is connected to the anode of the secondary diode 22 and the second output line OL2. Thus, the rectifying-smoothing circuit 30 is connected to the secondary winding W2 of the transformer 18 via the second capacitor 19. In the modification, the cathode of the secondary diode 22 is an example of one terminal (i.e., first terminal) of the secondary rectifier element, and the anode of the secondary diode 22 is an example of the other terminal (i.e., second terminal) of the secondary rectifier element. In this modification, the polarity of the secondary winding W2 is reversed. Specifically, the starting ends of the primary winding W1 and the secondary winding W2 are arranged opposite to each other.

The output capacitor 23 is connected to the first output line OL1 and the second output line OL2. Specifically, the first terminal t81 of the output capacitor 23 is connected to the first output line OL1. The first output line OL1 is connected to the first output terminal t91. Thus, the first terminal t81 of the output capacitor 23 is connected to the first output terminal t91. Further, the second terminal t82 of the output capacitor 23 is connected to the second output line OL2. The second output line OL2 is connected to the second output terminal t92. Thus, the second terminal t82 of the output capacitor 23 is connected to the second output terminal t92.

The second terminal t72 of the second inductor 21 is connected to the first output line OL1. As described above, the first terminal t71 of the second inductor 21 and the cathode of the secondary diode 22 are connected to each other. Further, the second terminal t72 of the second inductor 21 and the first terminal t81 of the output capacitor 23 are connected to each other. Thus, the cathode of the secondary diode 22 is connected to the first terminal t81 of the output capacitor 23 via the second inductor 21. The anode of the secondary diode 22 is connected to the second terminal t82 of the output capacitor 23.

In this configuration, when one of the two arm switching elements Q1, Q2 is in the non-conductive state, the secondary diode 22 becomes conductive. That is, the primary winding W1 and the secondary winding W2 are magnetically coupled to each other to have a polarity such that the secondary diode 22 becomes conductive when one of the two arm switching elements Q1 and Q2 is in the non-conductive state. In such a configuration, the same advantage is obtained by the controller 50 performing the above switching control.

Figure 15:
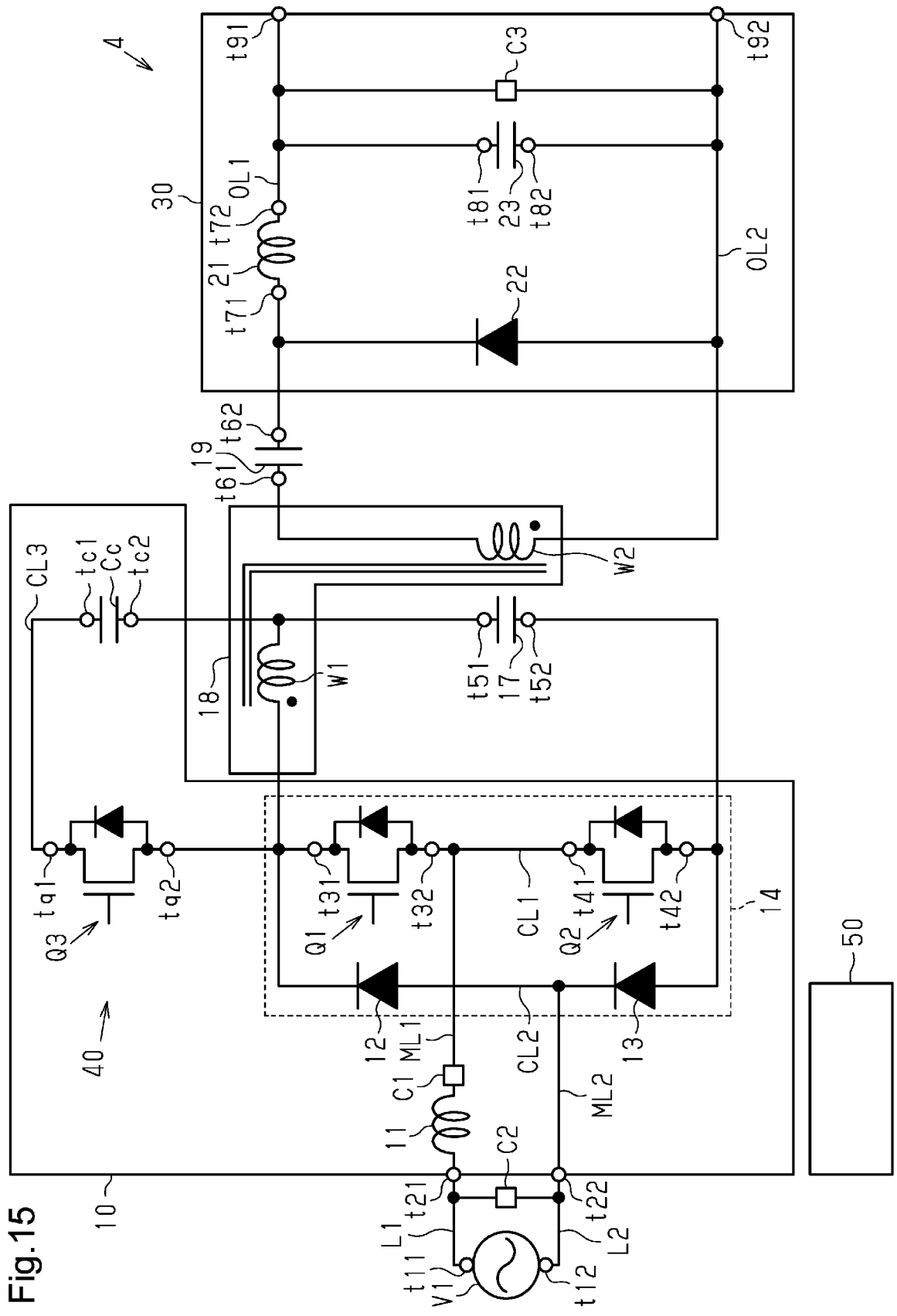
FIG. 15 is a circuit diagram showing a power conversion device 4 of a further modification.

As shown in FIG. 15, a power conversion device 4 may be used. In this device, the primary circuit 10, the first capacitor 17, the transformer 18, and the buffer circuit 40 are connected to each other in a manner that is different from the manner of the power conversion device 3. Specifically, in the power conversion device 4, the starting end of the primary winding W1 is electrically connected to the cathode of the upper arm diode 12 and the first terminal t31 of the upper arm switching element Q1. The finishing end of the primary winding W1 is connected to the first terminal t51 of the first capacitor 17, and the second terminal t52 of the first capacitor 17 is connected to the anode of the lower arm diode 13 and the second terminal t42 of the lower arm switching element Q2.

The terminal tq2 of the buffer switching element Q3 is connected to a connection point between the bridge circuit 14 (specifically, the cathode of the upper arm diode 12 and the first terminal t31) and the starting end of the primary winding W1. The terminal tc2 of the buffer capacitor Cc is connected to the finishing end of the primary winding W1 and to the first terminal t51 of the first capacitor 17. Thus, the buffer capacitor Cc is connected in parallel to the primary winding W1 of the transformer 18 via the buffer switching element Q3. The buffer capacitor Cc is connected in series to the first capacitor 17. In such a configuration, the same advantage is obtained by the controller 50 performing the above switching control.

Figure 16:
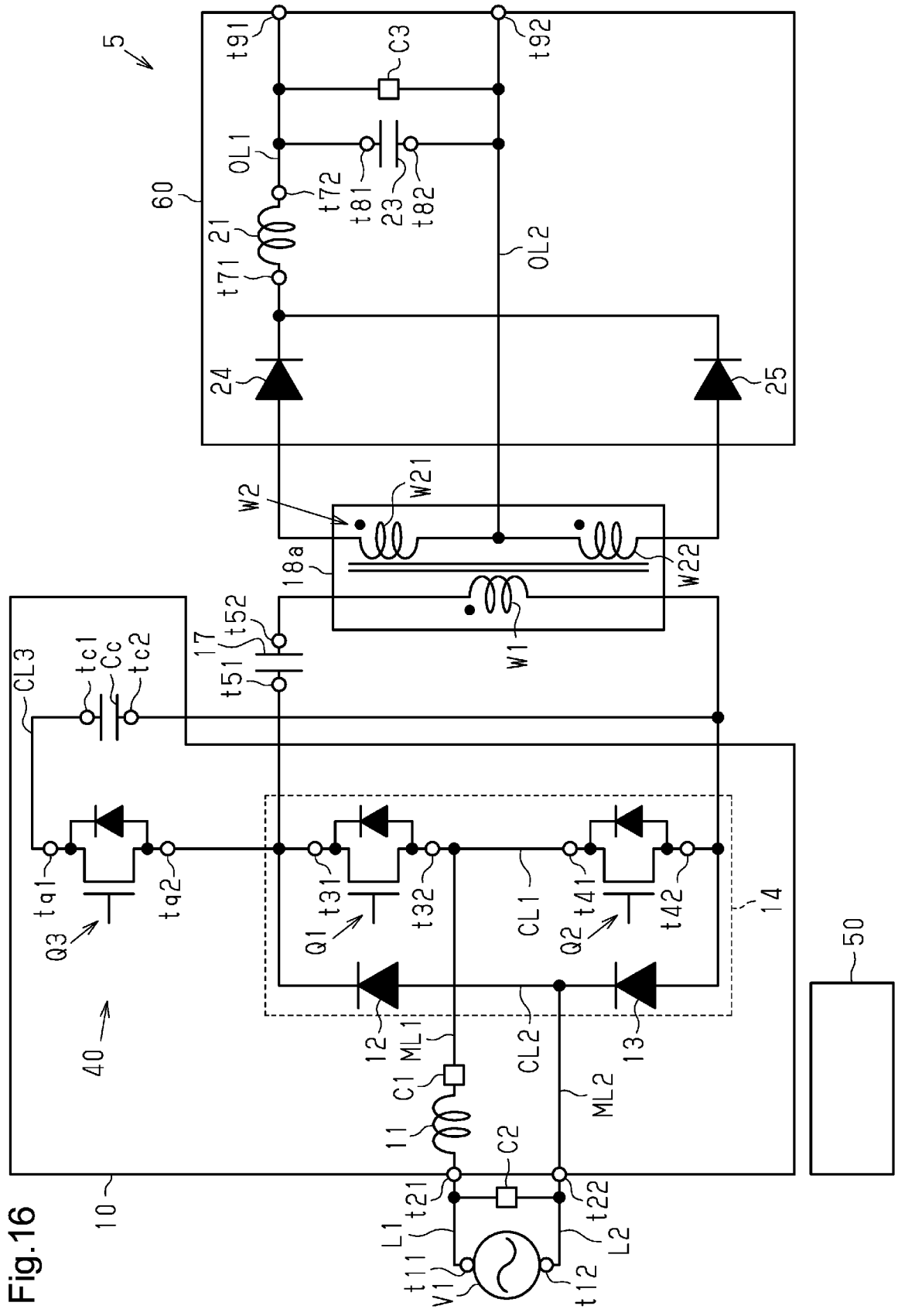
FIG. 16 is a circuit diagram showing a power conversion device 5 of yet another modification.

As shown in FIG. 16, a power conversion device 5 having a configuration on the secondary side different from that of the power conversion device 1 may be used. The power conversion device 5 includes the primary circuit 10, the first capacitor 17, a transformer 18*a*, the buffer circuit 40, the controller 50, and a rectifying-smoothing circuit 60. The transformer 18*a* includes a first secondary winding W21 and a second secondary winding W22 as the secondary winding W2. The rectifying-smoothing circuit 60 includes the second inductor 21, the output capacitor 23, a first secondary diode 24, a second secondary diode 25, the first output line OL1, the second output line OL2, the first output terminal t91, and the second output terminal t92.

The starting end of the first secondary winding W21 is electrically connected to the anode of the first secondary diode 24. The finishing end of the second secondary winding W22 is electrically connected to the anode of the second secondary diode 25. The cathode of the first secondary diode 24 is connected to one terminal (i.e., first terminal) of the output capacitor 23 via the second inductor 21. Specifically, the anode of the first secondary diode 24 is connected to the first terminal t71 of the second inductor 21. The cathode of the second secondary diode 25 is connected to a connection point between the cathode of the first secondary diode 24 and the first terminal t71. The finishing end of the first secondary winding W21 and the starting end of the second secondary winding W22 are connected to each other.

The first secondary diode 24 and the second secondary diode 25, when connected as described above, each allow one of the current flowing through the first secondary winding W21 and the current flowing through the second secondary winding W22, while limiting the other. Specifically, when the potential at the starting end of the primary winding W1 is higher than the potential at the finishing end, the first secondary diode 24 allows current to flow from the first secondary winding W2 of the secondary winding W21 to the second inductor 21 and beyond. In addition, the second secondary diode 25 prohibits current from flowing from the second secondary winding W2 of the secondary winding W22 to the second inductor 21 and beyond. When the potential at the finishing end of the primary winding W1 is higher than the potential at the starting end of the primary winding W1, the second secondary diode 25 allows current to flow from the second secondary winding W22 of the secondary winding W2 to the second inductor 21 and beyond. In addition, the first secondary diode 24 prohibits current from flowing from the first secondary winding W1 of the secondary winding W22 to the second inductor 21 and beyond.

In the modification, the first secondary diode 24 is an example of a first secondary rectifier element, the cathode of the first secondary diode 24 is an example of one terminal (i.e., first terminal) of the first secondary rectifier element, and the anode of the first secondary diode 24 is an example of the other terminal (second terminal) of the first secondary rectifier element. The second secondary diode 25 is an example of a second secondary rectifier element, the cathode of the second secondary diode 25 is an example of one terminal (first terminal) of the second secondary rectifier element, and the anode of the second secondary diode 25 is an example of the other terminal (second terminal) of the second secondary rectifier element.

The output capacitor 23 is connected to the first output line OL1 and the second output line OL2. Specifically, the first terminal t81 of the output capacitor 23 is connected to the first output line OL1. Further, the second terminal t82 of the output capacitor 23 is connected to the second output line OL2.

The second inductor 21 is provided between the first secondary diode 24 and the output capacitor 23 on the first output line OL1. Specifically, the second inductor 21 is provided between a connection point of the first secondary diode 24 and a connection point of the output capacitor 23 on the first output line OL1. As described above, the cathode of the first secondary diode 24 and the cathode of the second secondary diode 25 are connected to the first terminal t71 of the second inductor 21. The second terminal t72 of the second inductor 21 and the first terminal t81 of the output capacitor 23 are connected to each other.

A connection point between the first secondary winding W21 and the second secondary winding W22 is connected to the second terminal t82 of the output capacitor 23 and the second output line OL2. The connection point between the first secondary winding W21 and the second secondary winding W22 is, for example, a midpoint of the secondary winding W2. Thus, the second terminal t82 of the output capacitor 23 is connected to the midpoint of the secondary winding W2.

When one of the two arm switching elements Q1, Q2 is in the non-conductive state, the secondary diode 22 becomes conductive. That is, the primary winding W1 and the secondary winding W2 are magnetically coupled to each other to have a polarity such that the secondary diode 22 becomes conductive when one of the two arm switching elements Q1 and Q2 is in the non-conductive state. In such a configuration, the same advantage is obtained by the controller 50 performing the above switching control.

In this modification, the current flowing through the first secondary winding W21 and the second secondary winding W22 is switched by the first secondary diode 24 and the second secondary diode 25 in accordance with the direction of the current flowing through the primary winding W1. Thus, the second capacitor 19 may be omitted.

Figure 17:
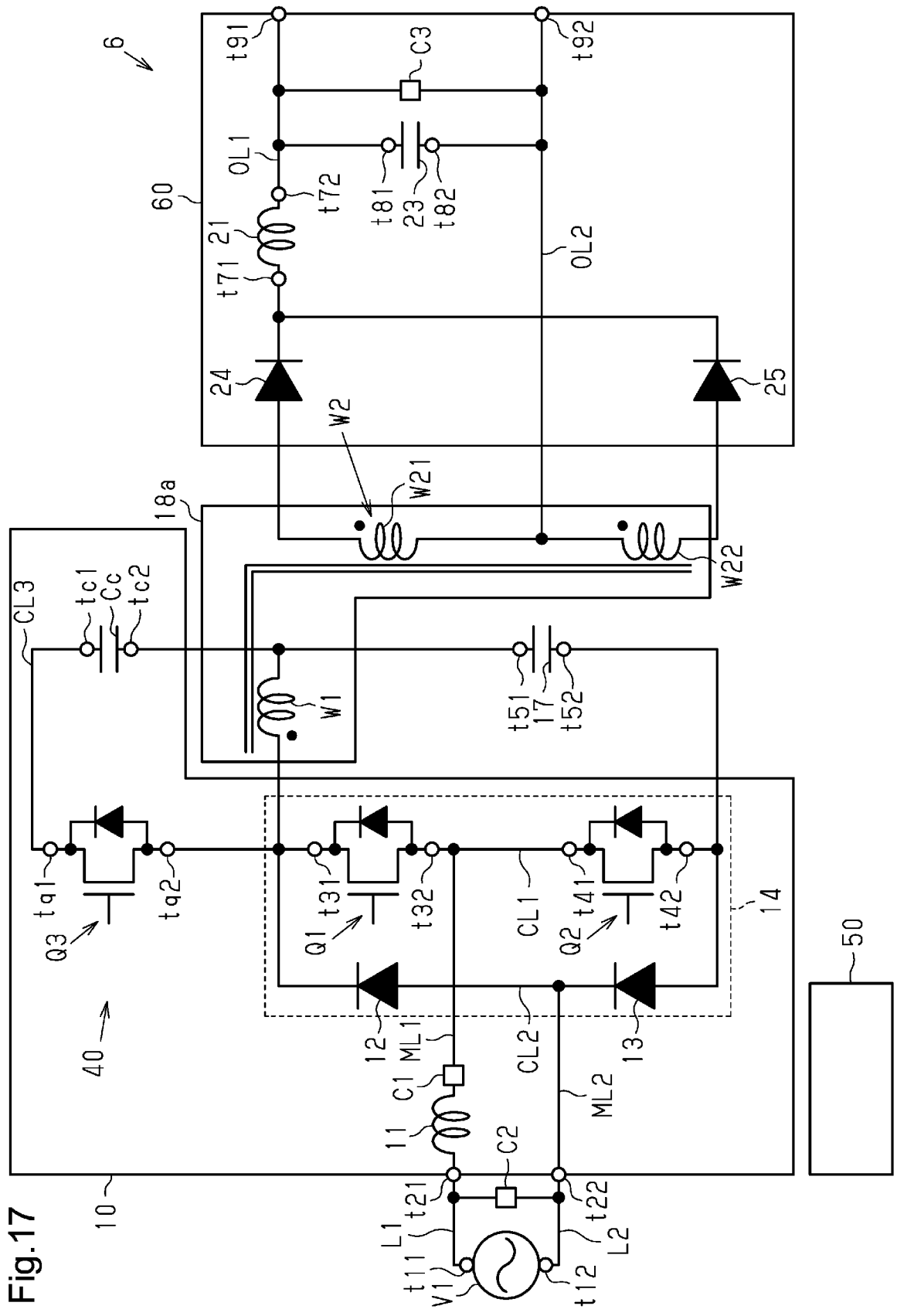
FIG. 17 is a circuit diagram showing a power conversion device 6 of still another modification.

The power conversion device 2 may be combined with the power conversion device 5. For example, as illustrated in FIG. 17, a power conversion device 6 has the same configuration as that of the power conversion device 5, but is different from the power conversion device 5 in the manner of connecting the primary circuit 10, the first capacitor 17, the transformer 18, and the buffer circuit 40 to each other. Specifically, in the power conversion device 6, the starting end of the primary winding W1 is electrically connected to the cathode of the upper arm diode 12 and the first terminal t31 of the upper arm switching element Q1. The finishing end of the primary winding W1 is connected to the first terminal t51 of the first capacitor 17, and the second terminal t52 of the first capacitor 17 is connected to the anode of the lower arm diode 13 and the second terminal t42 of the lower arm switching element Q2.

The terminal tq2 of the buffer switching element Q3 is connected to a connection point between the bridge circuit 14 (specifically, the cathode of the upper arm diode 12 and the first terminal t31) and the starting end of the primary winding W1. The terminal tc2 of the buffer capacitor Cc is connected to the finishing end of the primary winding W1 and to the first terminal t51 of the first capacitor 17. Thus, the buffer capacitor Cc is connected in parallel to the primary winding W1 of the transformer 18 via the buffer switching element Q3. The buffer capacitor Cc is connected in series to the first capacitor 17. In such a configuration, the same advantage is obtained by the controller 50 performing the above switching control. Further, the power conversion device 6 reduces the withstand voltage of the buffer capacitor Cc and eliminates the need for the second capacitor 19.

The diodes do not have to be used as the upper arm rectifier element and the lower arm rectifier element. Instead, switching elements may be used instead of the diodes. In this case, the controller 50 performs synchronous rectification control to turn on the switching elements at the point in time when the upper arm diode 12 and the lower arm diode 13 become conductive. The use of the switching elements instead of the diodes reduces conduction loss.

In the above modification, the rectifying-smoothing circuit 20 and the rectifying-smoothing circuit 30 include the secondary diode 22 as the secondary rectifier element, and the rectifying-smoothing circuit 60 includes the first secondary diode 24 and the second secondary diode 25 as the secondary rectifier element. Instead, the rectifying-smoothing circuit 20 and the rectifying-smoothing circuit 30 may include a switching element instead of the secondary diode 22. The rectifying-smoothing circuit 60 may include switching elements instead of the first secondary diode 24 and the second secondary diode 25. In this case, the controller 50 performs synchronous rectification control to turn on the switching elements in a state of a switching pattern in which the secondary diode 22, the first secondary diode 24, and the second secondary diode 25 are conductive. As a result, the rectifying-smoothing circuit 20, the rectifying-smoothing circuit 30, and the rectifying-smoothing circuit 60 reduce conduction loss using switching elements instead of diodes.

In the embodiment, the first inductor 11 is connected between the first input terminal t21 and the first connection line CL1. However, the position of the first inductor 11 is not limited thereto. Instead, the first inductor 11 may be connected between the second input terminal t22 and the second connection line CL2. The first inductor 11 may include two inductors, and may be connected between the first input terminal t21 and the first connection line CL1 and between the second input terminal t22 and the second connection line CL2.

In the embodiment, the first capacitor 17 is connected between the starting end of the primary winding W1 and the first terminal t31 of the upper arm switching element Q1. However, the position of the first capacitor 17 is not limited thereto. For example, the first capacitor 17 may be connected between the finishing end of the primary winding W1 and the second terminal t42 of the lower arm switching element Q2. Further, the first capacitor 17 may include two capacitors. In this case, the two capacitors may be provided between the starting end of the primary winding W1 and the first terminal Q1 of the upper arm switching element t31 and between the finishing end of the primary winding W1 and the second terminal t42 of the lower arm switching element t42.

In the embodiment, the second capacitor 19 is connected between the starting end of the secondary winding W2 and the anode of the secondary diode 22, but the position of the second capacitor 19 is not limited thereto. For example, the second capacitor 19 may be connected between the finishing end of the secondary winding W2 and the second terminal t72 of the second inductor 21. In addition, the second capacitor 19 may include two capacitors. In this case, the two capacitors may be provided between the starting end of the secondary winding W2 and the anode of the secondary diode 22 and between the finishing end of the secondary winding W2 and the second terminal t72 of the second inductor 21.

The current sensor C1 may be provided on the second intermediate line ML2, instead of on the first intermediate line ML1.

The controller 50 may be circuitry including one or more processors that execute various processes in accordance with a computer program (software). The controller 50 may include circuitry that includes one or more dedicated hardware circuits such as application specific integrated circuits (ASICs) that execute at least part of various processes, or may include a combination of one or more processors and one or more dedicated hardware circuits. The processor includes a CPU and memory such as a RAM and ROM. The memory, or a non-transitory computer-readable storage medium, stores program codes or instructions configured to cause the CPU to execute the processes. The memory includes any type of medium that is accessible by general-purpose or dedicated computers.

Preferred aspects understood from the above embodiment and modifications will now be described.

(1) After a specific pattern, the controller may switch through a dead-time pattern, in which the buffer switching element is in a conductive state and the two arm switching elements are in a non-conductive state, to a switching pattern in which the lower arm switching element is in the non-conductive state and the upper arm switching element and the buffer switching element are in the conductive state.

(2) After a specific pattern, the controller may switch through a dead-time pattern, in which the buffer switching element is in a conductive state and the two arm switching elements are in a non-conductive state, to a switching pattern in which the upper arm switching element is in the non-conductive state and the lower arm switching element and the buffer switching element are in the conductive state.

(3) A power conversion device designed to address the above problem converts AC voltage input from an AC power supply into DC voltage. The power conversion device includes a transformer including a primary winding and a secondary winding, a first capacitor, a primary circuit including two input terminals to which the AC power supply is connected, a first inductor, an upper arm switching element, a lower arm switching element, an upper arm rectifier element, and a lower arm rectifier element, and a rectifying-smoothing circuit including a second inductor, a secondary rectifier element, an output capacitor, a first output terminal, and a second output terminal. A series connection of the upper arm switching element and the lower arm switching element and a series connection of the upper arm rectifier element and the lower arm rectifier element form a bridge circuit, and a connection point between the upper arm switching element and the lower arm switching element and a connection point between the upper arm rectifier element and the lower arm rectifier element are connected to each other via the two input terminals and the first inductor. The primary circuit includes a buffer circuit having a buffer switching element and a buffer capacitor. The primary circuit is connected to the primary winding of the transformer via the first capacitor. The rectifying-smoothing circuit is connected to the secondary winding of the transformer. The power conversion device comprises a controller configured to control switching of the upper arm switching element, the lower arm switching element, and the buffer switching element. The controller controls switching to sequentially switch between switching patterns including a specific pattern in which one of the two arm switching elements enters a conductive state and the other one of the two arm switching elements and the buffer switching element enter a non-conductive state.

In this configuration, the voltage of the buffer capacitor can be applied to the primary winding by setting the switching pattern to the specific pattern. This allows current to flow through the secondary rectifier element.

REFERENCE SIGNS LIST 1, 2, 3, 4, 5, 6) Power Conversion Device; 10) Primary Circuit; 11) First Inductor; 12) Upper Arm Diode; 13) Lower Arm Diode; 14) Bridge Circuit; 17) First Capacitor; 18, 18a) Transformer; 19) Second Capacitor; 20, 30, 60) Rectifying-Smoothing Circuit; 21) Second Inductor; 22) Secondary Diode; 23) Output Capacitor; 24) First Secondary Diode; 25) Second Secondary Diode; 40) Buffer Circuit; 50) Controller; C1) Current Sensor; C2, C3) Voltage Sensor; Cc) Buffer Capacitor; CL1) First Connection Line; CL2) Second Connection Line; CL3) Third Connection Line; L1) First Input Line; L2) Second Input Line; ML1) First Intermediate Line; ML2) Second Intermediate Line; OL1) First Output Line; OL2) Second Output Line; Q1) Upper Arm Switching Element; Q2) Lower Arm Switching Element; Q3) Buffer Switching Element; t21, t22) Input Terminal; t91) First Output Terminal; t92) Second Output Terminal; V1) AC Power Supply; W1) Primary Winding; W2) Secondary Winding; W21) First Secondary Winding; W22) Second Secondary Winding

The invention claimed is:

1. A power conversion device that converts AC voltage input from an AC power supply into DC voltage, the power conversion device comprising:
    a transformer including a primary winding and a secondary winding;
    a first capacitor;
    a primary circuit including two input terminals to which the AC power supply is connected, a first inductor, an upper arm switching element, a lower arm switching element, an upper arm rectifier element, and a lower arm rectifier element; and
    a rectifying-smoothing circuit including a second inductor, a secondary rectifier element, an output capacitor, a first output terminal, and a second output terminal, wherein
    a series connection of the upper arm switching element and the lower arm switching element and a series connection of the upper arm rectifier element and the lower arm rectifier element form a bridge circuit, and a connection point between the upper arm switching element and the lower arm switching element and a connection point between the upper arm rectifier element and the lower arm rectifier element are connected to each other via the two input terminals and the first inductor,
    the primary circuit includes a buffer circuit having a buffer switching element and a buffer capacitor,
    the primary circuit is connected to the primary winding of the transformer via the first capacitor,
    the rectifying-smoothing circuit is connected to the secondary winding of the transformer,
    the power conversion device comprises a controller configured to control switching of the upper arm switching element, the lower arm switching element, and the buffer switching element, and
    the controller controls switching to sequentially switch a switching pattern including a pattern in which one of the two arm switching elements enters a conductive state so that the AC power supply is short-circuited by the first inductor, the other one of the two arm switching elements enters a non-conductive state, and the buffer switching element enters the conductive state.

2. The power conversion device according to claim 1, wherein the buffer circuit is connected in parallel to the bridge circuit.

3. The power conversion device according to claim 1, the buffer circuit is connected in parallel to the primary winding of the transformer.

4. The power conversion device according to claim 1, further comprising a second capacitor, wherein
    in the rectifying-smoothing circuit,
        the first output terminal and a first terminal of the output capacitor are connected to each other,
        the second output terminal and a second terminal of the output capacitor are connected to each other, and
        a first terminal of the second inductor is connected to the first terminal of the output capacitor via the secondary rectifier element, and a second terminal of the second inductor is connected to the second terminal of the output capacitor,
    the rectifying-smoothing circuit is connected to the secondary winding of the transformer via the second capacitor, and
    the primary winding and the secondary winding are magnetically coupled to each other to have a polarity such that the secondary rectifier element becomes conductive when at least one of the upper arm switching element and the lower arm switching element is in the non-conductive state.

5. The power conversion device according to claim 1, further comprising a second capacitor, wherein
    in the rectifying-smoothing circuit,
        the first output terminal and a first terminal of the output capacitor are connected to each other,
        the second output terminal and a second terminal of the output capacitor are connected to each other, and
        a first terminal of the secondary rectifier element is connected to the first terminal of the output capacitor via the second inductor, and a second terminal of the secondary rectifier element is connected to the second terminal of the output capacitor, the rectifying-smoothing circuit is connected to the secondary winding of the transformer via the second capacitor, and the primary winding and the secondary winding are magnetically coupled to each other to have a polarity such that the secondary rectifier element becomes conductive when at least one of the upper arm switching element and the lower arm switching element is in the non-conductive state.

6. The power conversion device according to claim 1, wherein the rectifying-smoothing circuit includes a first secondary rectifier element and a second secondary rectifier element as the secondary rectifier element, the first output terminal and a first terminal of the output capacitor are connected to each other, the second output terminal and a second terminal of the output capacitor are connected to each other, a first terminal of the first secondary rectifier element is connected to the first terminal of the output capacitor via the second inductor, a second terminal of the first secondary rectifier element is connected to a first terminal of the secondary winding, a first terminal of the second secondary rectifier element is connected to a connection point between the second inductor and the first secondary rectifier element, a second terminal of the second secondary rectifier element is connected to a second terminal of the secondary winding, the second terminal of the output capacitor is connected to a midpoint of the secondary winding, and the primary winding and the secondary winding are magnetically coupled to each other to have a polarity such that one of the first secondary rectifier element and the second secondary rectifier element becomes conductive when one of the upper arm switching element and the lower arm switching element is in the non-conductive state.

7. The power conversion device according to claim 1, wherein when one or all of the upper arm rectifier element, the lower arm rectifier element, and the secondary rectifier element include switching elements, the controller controls switching of the switching elements based on the AC voltage and current that flows through the first inductor such that a power factor of input power is corrected.

8. The power conversion device according to claim 1, wherein when one or all of the upper arm rectifier element, the lower arm rectifier element, and the secondary rectifier element include switching elements, the controller controls switching of the switching elements based on a voltage between the first output terminal and the second output terminal such that a predetermined DC voltage is output.

* * * * *